United States Patent
Zhou et al.

(10) Patent No.: US 11,658,781 B2
(45) Date of Patent: May 23, 2023

(54) TECHNIQUES FOR UPDATING REFERENCE SIGNALS

(71) Applicant: QUALCOMM incorporated, San Diego, CA (US)

(72) Inventors: Yan Zhou, San Diego, CA (US); Tao Luo, San Diego, CA (US); Ruhua He, San Diego, CA (US); Stefan Brueck, Neunkirchen am Brand (DE); Parisa Cheraghi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/805,652

(22) Filed: Feb. 28, 2020

(65) Prior Publication Data

US 2020/0351046 A1    Nov. 5, 2020

Related U.S. Application Data

(60) Provisional application No. 62/843,330, filed on May 3, 2019.

(51) Int. Cl.
*H04L 5/00*        (2006.01)
*H04W 52/24*      (2009.01)
(Continued)

(52) U.S. Cl.
CPC ......... *H04L 5/0048* (2013.01); *H04B 7/0695* (2013.01); *H04L 5/0051* (2013.01);
(Continued)

(58) Field of Classification Search
CPC ..... H04L 5/0048; H04L 5/005; H04L 5/0051; H04L 25/0226; H04W 52/146;
(Continued)

(56) References Cited

U.S. PATENT DOCUMENTS

2014/0177531 A1*   6/2014   Imamura ............... H04L 5/0048
                                                               370/328
2018/0278314 A1    9/2018   Nam et al.
(Continued)

FOREIGN PATENT DOCUMENTS

| CN | 103379589 B | 4/2016 |
|---|---|---|
| EP | 3481113 A1 | 5/2019 |
| WO | WO-2018203728 A1 | 11/2018 |

OTHER PUBLICATIONS

International Search Report and Written Opinion—PCT/US2020/020687—ISA/EPO—dated Jun. 23, 2020.
(Continued)

*Primary Examiner* — Ian N Moore
*Assistant Examiner* — Brian T Le
(74) *Attorney, Agent, or Firm* — Holland & Hart LLP

(57) ABSTRACT

Methods, systems, and devices for wireless communications are described. The described techniques provide for dynamic updates to beam failure detection (BFD) reference signals (RSs) and path loss RS using medium access control-control element (MAC-CE) or downlink control information (DCI). For example, the quasi co-location (QCL) of periodic CSI-RS may be dynamically updated by the MAC-CE or DCI when the periodic CSI-RS is for BFD RS. Also, a semi-persistent CSI-RS or aperiodic CSI-RS may act as a BFD RS. An enhanced update procedure may be used to update the path loss RS dynamically using MAC-CE or DCI. In some cases, the path loss RS parameters updated via MAC-CE or DCI may overwrite the previously RRC configured path loss RS parameters. In another example, if the path loss RS is not configured, then the path loss RS by default may be the spatial relation reference signal of the corresponding uplink beam.

24 Claims, 20 Drawing Sheets

(51) Int. Cl.

| | |
|---|---|
| *H04W 52/14* | (2009.01) |
| *H04B 7/06* | (2006.01) |
| *H04L 25/02* | (2006.01) |
| *H04W 16/28* | (2009.01) |
| *H04W 56/00* | (2009.01) |
| *H04W 80/02* | (2009.01) |
| *H04W 72/21* | (2023.01) |
| *H04W 72/23* | (2023.01) |

(52) U.S. Cl.
CPC ......... *H04L 25/0226* (2013.01); *H04W 16/28* (2013.01); *H04W 52/146* (2013.01); *H04W 52/242* (2013.01); *H04W 56/001* (2013.01); *H04W 72/21* (2023.01); *H04W 72/23* (2023.01); *H04W 80/02* (2013.01)

(58) Field of Classification Search
CPC . H04W 52/242; H04W 72/042; H04W 16/28; H04W 56/001; H04W 72/0413; H04W 80/02; H04B 7/0695
See application file for complete search history.

(56) References Cited

U.S. PATENT DOCUMENTS

| | | | |
|---|---|---|---|
| 2018/0302889 A1 | 10/2018 | Guo et al. | |
| 2019/0044681 A1* | 2/2019 | Zhang | H04L 5/0094 |
| 2019/0069285 A1 | 2/2019 | Chandrasekhar et al. | |
| 2019/0115955 A1 | 4/2019 | John Wilson et al. | |
| 2019/0199554 A1* | 6/2019 | Park | H04W 52/32 |
| 2020/0236574 A1* | 7/2020 | Ohuchi | H04B 7/0626 |
| 2020/0351674 A1 | 11/2020 | Zhou | |
| 2021/0352705 A1 | 11/2021 | Kang et al. | |

OTHER PUBLICATIONS

Samsung: "On Beam Indication", 3GPP Draft, 3GPP TSG RAN WG1 Meeting 90bis, R1-1717627 on Beam Indication_V1, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 2, 2017 (Oct. 2, 2017), XP051352484, 9 Pages, Retrieved from the Internet: URL:http://www.3gpp.org/ftp/tsg_ran/WG1_RL1/TSGR1_90b/Docs/ [retrieved on Oct. 2, 2017], sections 2.1-2.3.

* cited by examiner

TECHNIQUES FOR UPDATING REFERENCE SIGNALS

CROSS REFERENCE

The present application for patent claims the benefit of U.S. Provisional Patent Application No. 62/843,330 by ZHOU et al., entitled "TECHNIQUES FOR UPDATING REFERENCE SIGNALS," filed May 3, 2019, assigned to the assignee hereof, and expressly incorporated by reference herein.

FIELD OF INVENTION

The following relates generally to wireless communications, and more specifically to techniques for updating reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, wireless communications systems may use reference signals for various purposes, such as beam failure detection, path loss estimation, channel state signaling, or the like. In some cases, reference signal configurations may be semi-statically signaled from a base station to a UE (e.g., using radio resource control (RRC) signaling). Such signaling may also indicate particular sets of resources for a type of reference signal. However, as various system parameters associated with the reference signals may change more frequently than the signaling is received, reconfiguring reference signals using semi-static signaling techniques may result in system latency and inefficient communications.

SUMMARY

The described techniques relate to improved methods, systems, devices, and apparatuses that support techniques for updating reference signals. Generally, the described techniques provide for dynamic updates to reference signals, including beam failure detection reference signals (BFD-RSs) and path loss reference signals, through a medium access control (MAC) control element (MAC-CE) or downlink control information (DCI). In such cases, a particular MAC-CE or DCI format for updating reference signal configurations may be used to quickly update a configuration of a reference signal, which may avoid reconfiguration latency (such as when reference signals are reconfigured via radio resource control (RRC) signaling) and/or reduce signaling overhead in the system. As an example, when a quasi co-location (QCL) parameter of a monitored control resource set (CORESET) changes, the QCL of a corresponding BFD-RS may be dynamically updated via the MAC-CE or DCI based on the change. For instance, a periodic channel state information reference signal (CSI-RS) may be dynamically updated by the MAC-CE or DCI, where the periodic CSI-RS may be utilized for the BFD-RS. In another example, a semi-persistent CSI-RS or aperiodic CSI-RS may be configured as the BFD-RS, and their QCL may also be quickly updated by MAC-CE or DCI when the QCL of the CORESET changes.

Enhanced procedures for updating path loss reference signals are also described. In such cases, a path loss reference signal may be dynamically updated using MAC-CE or DCI. In some examples, path loss reference signal parameters updated via MAC-CE or DCI may overwrite previously RRC-configured path loss reference signal parameters. In another example, if the path loss reference signal is not configured (such as when the configuration of the path loss reference signal is optional), then the path loss reference signal may default to a spatial relation reference signal of a corresponding uplink beam. Specifically, if the path loss reference signal is not configured, then the path loss reference signal may be the spatial reference signal for a spatial relation (e.g., corresponding to a beam) of an uplink channel resource that is configured via RRC.

DETAILED DESCRIPTION

Figure 1:
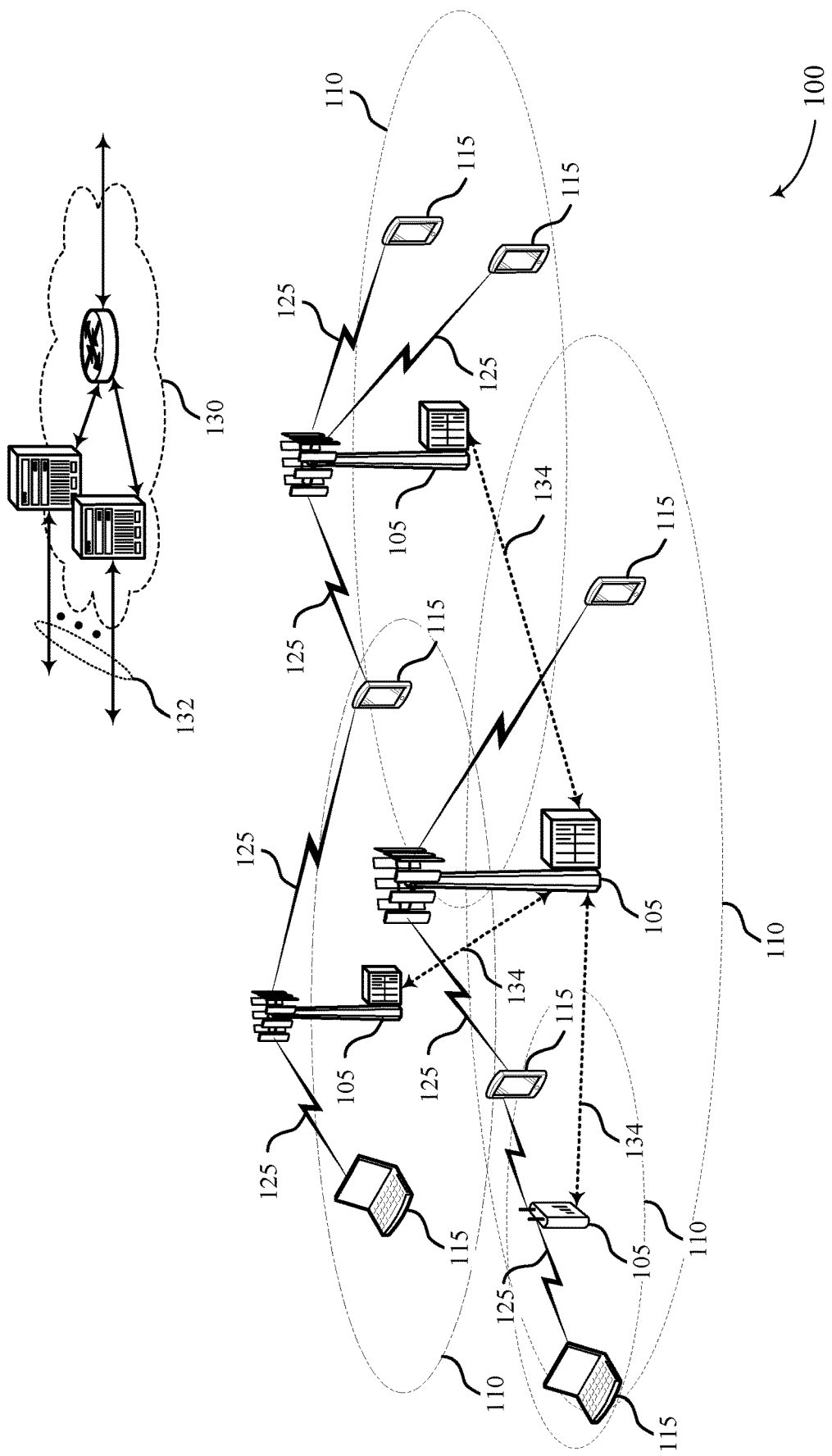
FIG. 1 illustrates an example of a system for wireless communications that supports techniques for updating reference signals in accordance with aspects of the present disclosure.

In some communication systems, RRC reconfiguration may be used when a transmission configuration indicator (TCI) state for a periodic CSI-RS changes. The RRC reconfiguration may update the TCI state ID and a quasi co-location (QCL) parameter for a channel state information reference signal (CSI-RS) (e.g., QCL type and/or QCL source). In some cases, beam failure detection reference signals (BFD-RSs) may be periodically transmitted and may be explicitly configured by RRC signaling or implicitly configured in a TCI state of a monitored control resource set (CORESET). In some examples, the BFD-RSs may include a periodic CSI-RS and a synchronization signal block (SSB).

In beam failure recovery, when the QCL of a monitored CORESET changes, the corresponding periodic BFD-RS may also need to be changed (e.g., to have a similar QCL). However, in some cases, the BFD-RS may only be updated either through semi-static RRC reconfiguration signaling or through the configuration of a large number of periodic CSI-RSs (e.g., with a large number of TCI states). But, RRC reconfiguration may introduce reconfiguration latency, and the configuration of a large number of periodic CSI-RSs may increase the signaling overhead of the system. For instance, if a BFD-RS corresponding to a monitored CORESET is explicitly configured by RRC signaling, either an updated BFD-RS may be configured with QCL matching that of the monitored CORESET, or a QCL of the original BFD-RS may be reconfigured, where both the updated BFD-RS and the reconfigured QCL may be conveyed using RRC signaling. Alternatively, if the corresponding BFD-RS is implicitly configured in a TCI state of the monitored CORESET, the BFD-RS is the periodic CSI-RS in the new TCI state of the monitored CORESET. In this case, the system may need to configure periodic CSI-RSs for all TCI states of the CORESET.

In some systems, a path loss reference signal for power control may also be RRC configured. For example, a path loss reference signal may be RRC configured per a physical uplink control channel (PUCCH) spatial relation for PUCCH power control. However, this may be an inefficient update methodology and may lead to latency issues when the path loss reference signal changes (or the resources used for the path loss reference signal changes). Likewise, for physical uplink shared channel (PUSCH) power control, path loss reference signal may be RRC configured using a sounding reference signal (SRS) resource indicator (SRI). For SRS power control, path loss reference signal may be RRC configured per SRS resource set for SRS power control. Thus, when a change of the path loss reference signal occurs in uplink power control, an RRC reconfiguration may be needed, but this reconfiguration may introduce latency into the system.

As described herein, a particular MAC-CE or DCI format that is associated with updating reference signal configuration may be used to update the BFD-RS to avoid reconfiguration latency and reduce signaling overhead in the system. For example, the QCL of periodic CSI-RS may be dynamically updated by the MAC-CE or DCI, at least when the periodic CSI-RS is for BFD-RS. Thus, the QCL of the original BFD-RS may be quickly updated without a large number of periodic CSI-RS. In another example, a semi-persistent CSI-RS or aperiodic CSI-RS may act as a BFD-RS, and if the semi-persistent CSI-RS or aperiodic CSI-RS are explicitly configured as BFD-RS, their QCL may be quickly updated by MAC-CE or DCI.

In further aspects, an enhanced update procedure for path loss reference signals may be used to overcome the described delays associated with RRC reconfiguration. For example, a path loss reference signal may be updated dynamically by MAC-CE or DCI such that the path loss reference signal may overwrite the previously RRC configured path loss reference signal. In another example, if the path loss reference signal is not configured, then the path loss reference signal may, by default, be a spatial relation reference signal of the corresponding uplink beam. Specifically, if the path loss reference signal is not configured in the PUCCH spatial relation for PUCCH power control, then the path loss reference signal may be the spatial reference signal in the spatial relation of the corresponding PUCCH resource. If the path loss reference signal is not configured per SRI for PUSCH power control, then the path loss reference signal may be the spatial reference signal in the spatial relation of the SRS resource indicated by SRI.

Aspects of the disclosure are initially described in the context of a wireless communications system. Aspects of the disclosure are further illustrated by and described with reference to apparatus diagrams, system diagrams, and flowcharts that relate to techniques for updating reference signals.

FIG. 1 illustrates an example of a wireless communications system 100 that supports techniques for updating reference signals in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30{,}720{,}000$ seconds. Time intervals of a communications resource may be organized according to radio frames each having a duration of 10 milliseconds (ms), where the frame period may be expressed as $T_f = 307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, base station 105 may transmit a new MAC-CE or DCI format that may be used to change the BFD-RS at UE 115 to avoid reconfiguration delays and reduce signaling overhead (e.g., RRC signaling) in the system 100. For instance, when the QCL of antenna ports at the UE 115 need to be updated, the QCL of periodic CSI-RS may be dynamically updated at UE 115 by the MAC-CE or DCI from base station 105, at least when the periodic CSI-RS is for BFD-RS. Thus, the QCL of the original BFD-RS may be quickly updated without the need of a large number of periodic CSI-RS. In another example, a semi-persistent CSI-RS or aperiodic CSI-RS may act as a BFD-RS.

In another example, an enhanced update procedure for path loss reference signal may be used to change the path loss reference signal dynamically at UE 115 using MAC-CE or DCI transmitted form base station 105. In some cases, the path loss reference signal parameters updated via MAC-CE or DCI from base station 105 may overwrite the previously RRC configured path loss reference signal parameters from base station 105. In another example, if the path loss reference signal is not configured at UE 115, then the path loss reference signal by default may be the spatial relation reference signal of the corresponding uplink beam for UE 115.

Figure 2:
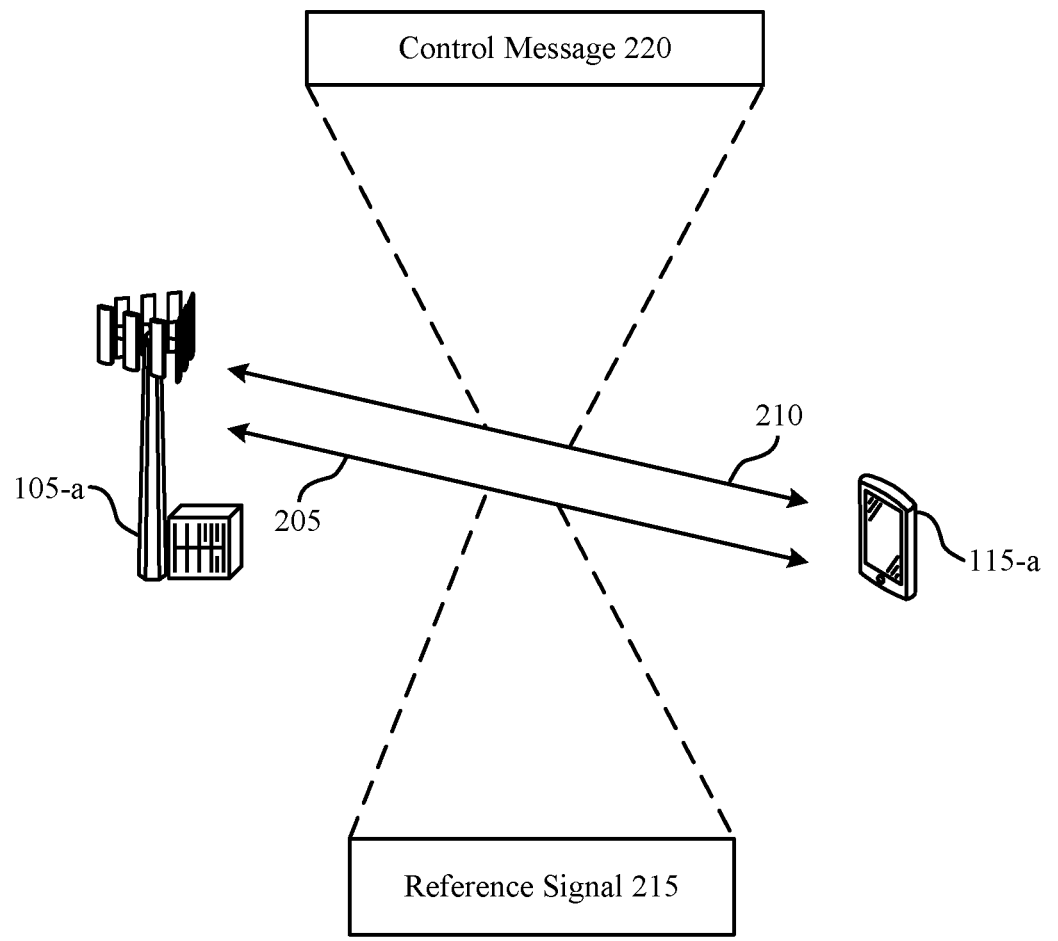
FIG. 2 illustrates an example of a system for wireless communications that supports techniques for updating reference signals in accordance with aspects of the present disclosure.

FIG. 2 illustrates an example of a wireless communications system 200 that supports techniques for updating reference signals in accordance with aspects of the present disclosure. In some examples, wireless communications system 200 may implement aspects of wireless communications system 100. In some examples, the wireless communications system 200 may include UE 115-a and base station 105-a, which may be examples of a UE 115 and base station 105, respectively, described with reference to FIG. 1.

In wireless communications system 200, reference signal 215 may include a periodic CSI-RS that may be used as a BFD-RS, and control message 220 may include a MAC-CE or DCI. In some cases, an RRC reconfiguration may be required when a TCI state for periodic CSI-RS changes. The RRC reconfiguration may update the TCI state ID and a QCL channel state information reference signal 215 (e.g., CSI-RS) parameter (e.g., QCL type and/or QCL source). In some cases, BFD-RS may be periodically transmitted, and may be explicitly configured by RRC signaling or implicitly configured via a TCI state of a monitored CORESET. In some examples, the BFD-RSs may include a periodic CSI-RS and an SSB.

In beam failure recovery, when the QCL of a monitored CORESET changes for UE 115-a, a control message 220 (e.g., a new MAC-CE or DCI format) may be used to update the reference signal 215 parameters (e.g., BFD-RS parameters) to avoid reconfiguration latency and reduce signaling overhead in the system. For example, the QCL of periodic CSI-RS may be dynamically updated by control message 220 (e.g., MAC-CE or DCI), at least when the reference signal 215 is periodic CSI-RS is for BFD-RS. Thus, the QCL of the original reference signal 215 (e.g., BFD-RS) may be quickly updated without the need of a large number of periodic CSI-RS. In another example, reference signal 215 may be a semi-persistent or aperiodic reference signal. For example, a semi-persistent or aperiodic reference signal 215 (e.g., CSI-RS) may act as a BFD-RS, and if the semi-persistent CSI-RS or aperiodic CSI-RS are explicitly configured as BFD-RS, their QCL may be quickly updated by control message 220 (e.g., MAC-CE or DCI).

In some systems, a reference signal 215 (e.g., path loss reference signal) for power control may be RRC configured. For example, reference signal 215 (e.g., path loss reference signal) may be RRC configured per physical uplink control channel (PUCCH) spatial relation for PUCCH power control, however, this may be an inefficient update methodology and may lead to latency concerns. For PUSCH power control, reference signal 215 (e.g., path loss reference signal) may be RRC configured per SRI. For SRS power control, reference signal 215 (e.g., path loss reference signal) may be RRC configured per SRS resource set for SRS power control. When a change of the reference signal 215 (e.g., path loss reference signal) occurs in uplink power control, an enhanced update procedure for reference signal 215 (e.g., path loss reference signal) may be used to overcome the previous deficiencies of RRC reconfiguration. For example, reference signal 215 (e.g., path loss reference signal) may be updated dynamically by control message 220 (e.g., MAC-CE or DCI) such that the reference signal 215 (e.g., path loss reference signal) may overwrite the previously RRC configured reference signal 215 (e.g., path loss reference signal). Reference signal 215 (e.g., path loss reference signal) may be a semi-persistent or aperiodic reference signal (e.g., SRS).

In another example, if a path loss reference signal is not configured, then the path loss reference signal by default may be reference signal 215 (e.g., spatial relation reference signal) of the corresponding uplink beam. Specifically, if the path loss reference signal is not configured in the PUCCH spatial relation for PUCCH power control, then the path loss reference signal may be reference signal 215 (e.g., spatial relation reference signal) in the spatial relation of the corresponding PUCCH resource. If a path loss reference signal is not configured per SRI for PUSCH power control, then the path loss reference signal may be reference signal 215 (e.g., the spatial reference signal) in the spatial relation of the SRS resource indicated by SRI.

Figure 3:
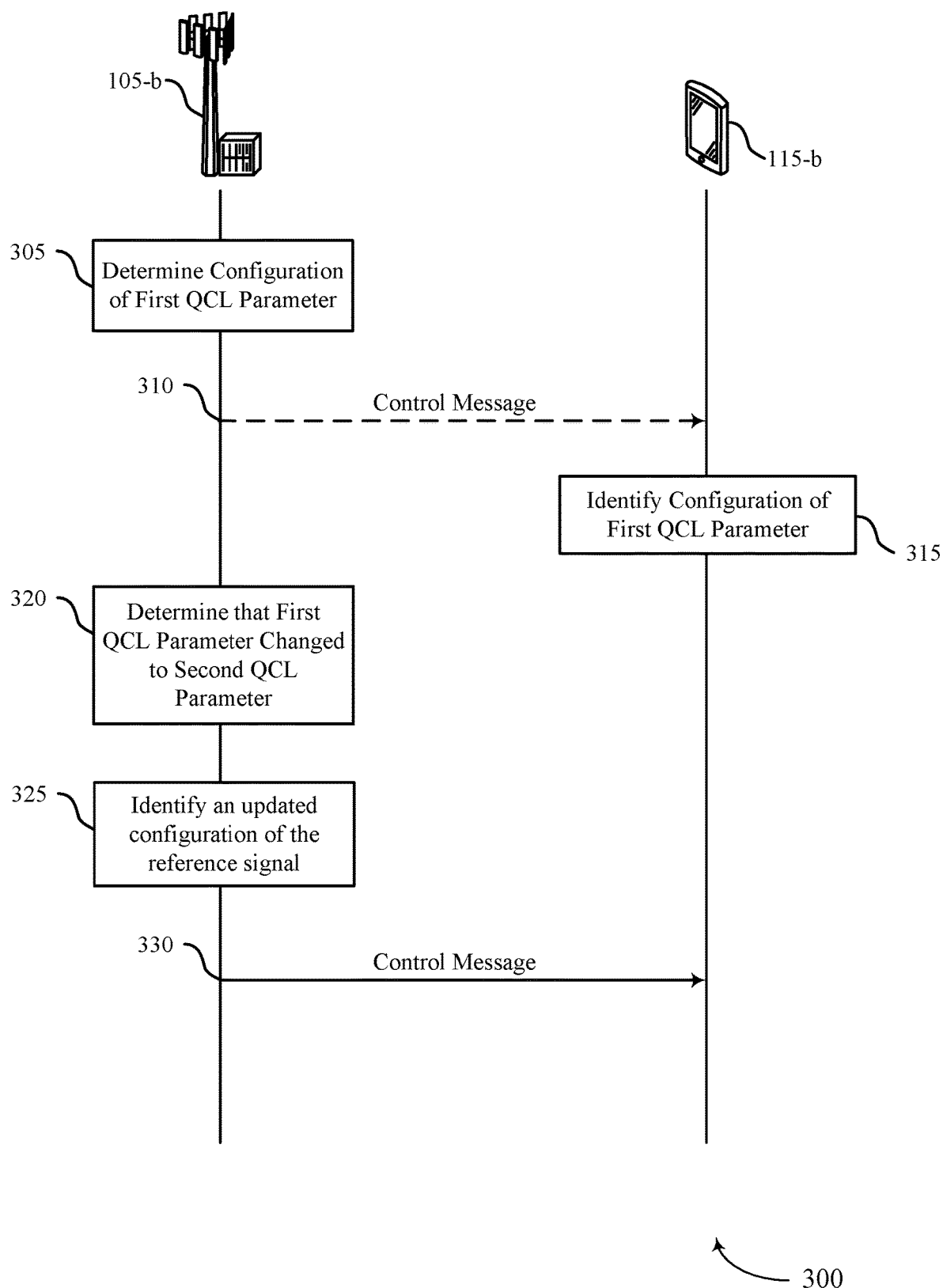
FIG. 3 illustrates an example of a process flow that supports techniques for updating reference signals in accordance with aspects of the present disclosure.

FIG. 3 illustrates an example of a process flow 300 that supports techniques for updating reference signals in accordance with aspects of the present disclosure. In some examples, process flow 300 may implement aspects of wireless communications system 100. Process flow 300 may be implemented by a base station 105-b and UE 115-b, which may be examples of a UE 115 and base station 105, respectively, described with reference to FIG. 1. Alternative examples of the following may be implemented, where some steps are performed in a different order than described or are not performed at all. In some cases, steps may include additional features not mentioned below, or further steps may be added.

At 305, base station 105-b may determine a configuration of a first quasi co-location parameter associated with a control resource set and a reference signal. In some cases, the reference signal may include one or more of a beam failure detection reference signal, a periodic CSI-RS, or a time/frequency tracking reference signal.

In some examples, base station 105-b may select a periodic CSI-RS as the reference signal, wherein the configuration indicates the periodic CSI-RS is for beam failure detection. In another example, base station 105-b may select one or more of a semi-persistent CSI-RS or an aperiodic CSI-RS as the reference signal, wherein the configuration indicates that one or more of the semi-persistent CSI-RS or the aperiodic CSI-RS is for beam failure detection.

At 310, base station 105-b may optionally transmit a radio resource control message comprising the configuration of the reference signal, wherein the first quasi co-location parameter is indicated by a transmission configuration indicator state identifier within the radio resource control message.

At 315, UE 115-b may identify a configuration of a first quasi co-location parameter associated with a control resource set and a reference signal.

In some examples, UE 115-b may determine that the reference signal includes a periodic CSI-RS for beam failure detection or that the reference signal includes one or more of a semi-persistent CSI-RS or an aperiodic CSI-RS for beam failure detection. The configuration may indicate that the reference signal comprises the semi-persistent CSI-RS or the aperiodic CSI-RS for beam failure detection.

At 320, base station 105-b may determine that the first quasi co-location parameter associated with the control resource set has changed to a second quasi co-location parameter different from the first quasi co-location parameter.

At 325, base station 105-b may identify an updated configuration of the reference signal based on the first quasi co-location parameter associated with the control resource set changing, the updated configuration configuring the reference signal with the second quasi co-location parameter.

At 330, base station 105-*b* may transmit, via one or more of MAC-CEs or DCI, the updated configuration of the reference signal. For instance, a format of the downlink control information may indicate the reference signal being configured with the second quasi co-location parameter.

In some cases, base station 105-*b* may then transmit the reference signal in accordance with the updated configuration, and UE 115-*b* may monitor for the reference signal based at least in part on the second quasi co-location parameter.

Figure 4:
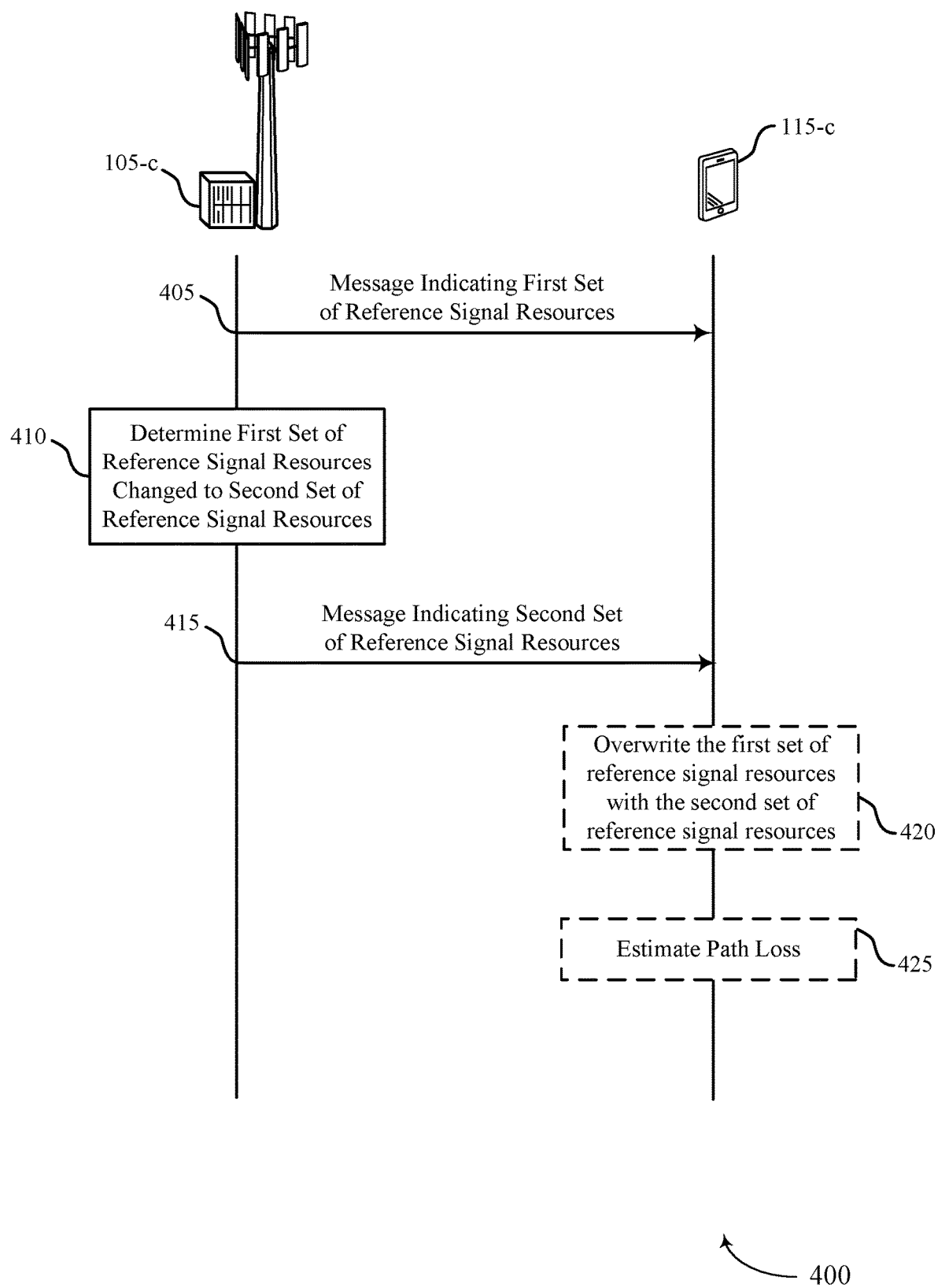
FIG. 4 illustrates an example of a process flow that supports techniques for updating reference signals in accordance with aspects of the present disclosure.

FIG. 4 illustrates an example of a process flow 400 that supports techniques for updating reference signals in accordance with aspects of the present disclosure. In some examples, process flow 400 may implement aspects of wireless communications system 100. Process flow 400 may be implemented by a base station 105-*c* and UE 115-*c*, which may be examples of a UE 115 and base station 105, respectively, described with reference to FIG. 1. Alternative examples of the following may be implemented, where some steps are performed in a different order than described or are not performed at all. In some cases, steps may include additional features not mentioned below, or further steps may be added.

At 405, base station 105-*c* may transmit, to UE 115-*c*, a first message that indicates a first set of reference signal resources configured for a path loss reference signal. In some cases, the first message may include an RRC message for uplink power control. The uplink power control may be one of more of physical uplink control channel power control, physical uplink shared channel power control, or SRS power control.

At 410, base station 105-*c* may determine that the first set of reference signal resources indicated at 405 has changed to a second set of reference signal resources.

At 415, base station 105-*c* may transmit, to UE 115-*c*, a second message that indicates the second set of reference signal resources configured for the path loss reference signal based on the determination of the first set of reference signal resources changing at 410. The second message may include one or more of a MAC-CE or DCI.

At 420, UE 115-*c* may optionally overwrite the first set of reference signal resources received at 405 with the second set of reference signal resources based on receiving the second message at 415.

At 425, UE 115-*c* may optionally estimate a path loss for an uplink bandwidth part based on the second set of reference signal resources associated with the path loss reference signal. In some examples, the path loss reference signal may include one or more of a CSI-RS or an SSB.

Figure 5:
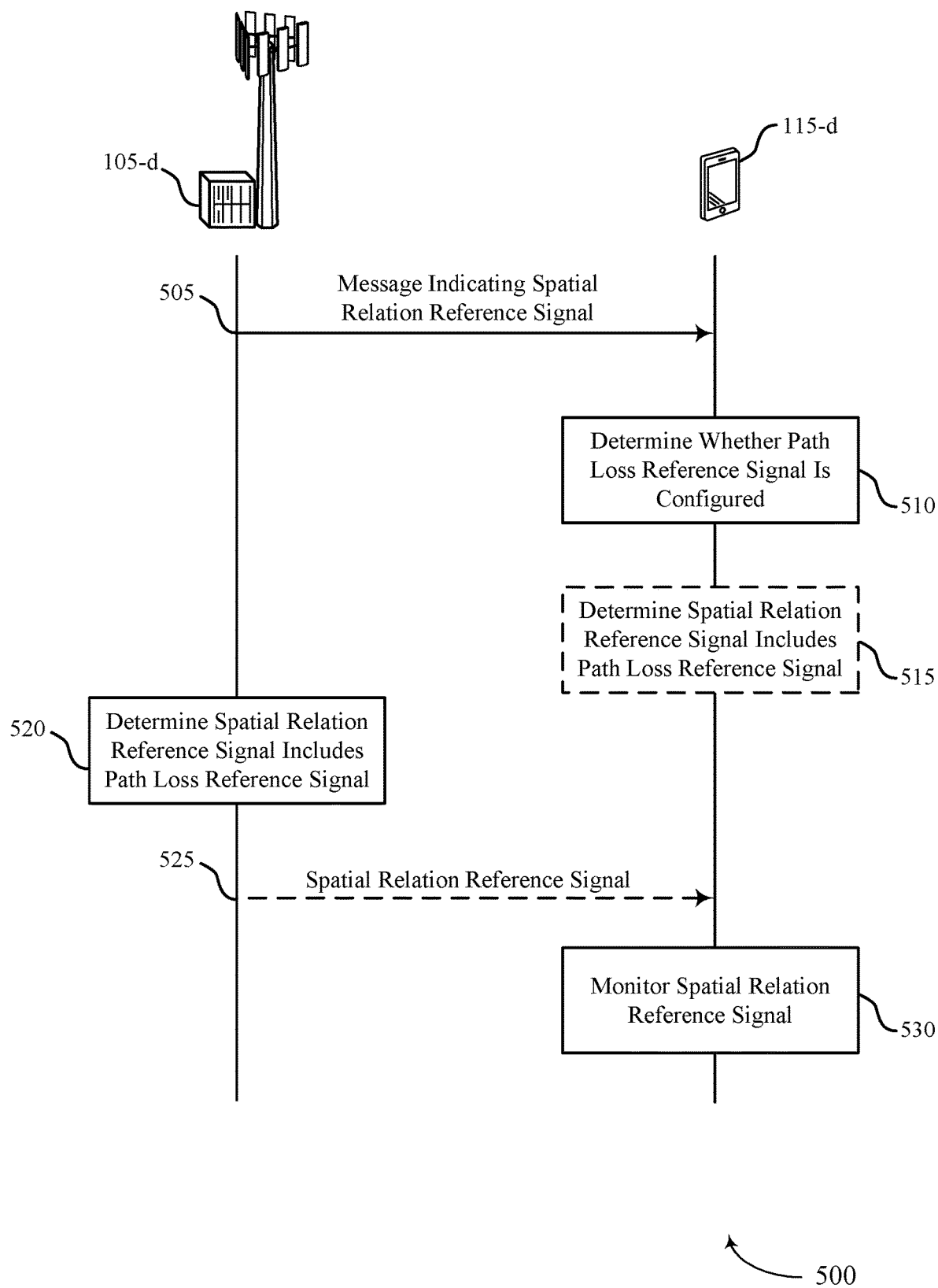
FIG. 5 illustrates an example of a process flow that supports techniques for updating reference signals in accordance with aspects of the present disclosure.

FIG. 5 illustrates an example of a process flow 500 that supports techniques for updating reference signals in accordance with aspects of the present disclosure. In some examples, process flow 500 may implement aspects of wireless communications system 100. Process flow 500 may be implemented by a base station 105-*d* and UE 115-*d*, which may be examples of a UE 115 and base station 105, respectively, described with reference to FIG. 1. Alternative examples of the following may be implemented, where some steps are performed in a different order than described or are not performed at all. In some cases, steps may include additional features not mentioned below, or further steps may be added.

At 505, the UE 115-*d* may receive a message from the base station 105-*d*. The message may indicate a spatial relation reference signal associated with an uplink beam. The spatial relation reference signal may correspond to a set of physical uplink control channel resources. In some examples, the spatial relation reference signal may include one or more of a synchronization signal block, a CSI-RS, or an SRS.

At 510, the UE 115-*d* may determine whether a path loss reference signal corresponding to the uplink beam is configured.

At 515, the UE 115-*d* may optionally determine that the spatial relation reference signal includes the path loss reference signal based on the determination that the path loss reference signal is not configured. The path loss estimation may be for uplink power control. The uplink power control may include one or more of physical uplink control channel power control, physical uplink shared channel power control, or SRS power control.

At 520, the base station 105-*d* may determine that a path loss reference signal corresponding to the uplink beam may not be configured. The spatial relation reference signal may be used for path loss estimation based on the determination.

At 525, the base station 105-*d* may optionally transmit the spatial relation reference signal. In some cases, the spatial relation reference signal may correspond to a set of SRS resources indicated by an SRS resource indicator.

At 530, the UE 115-*d* may monitor the spatial relation reference signal for path loss estimation based on a determination that the path loss reference signal is not configured.

Figure 6:
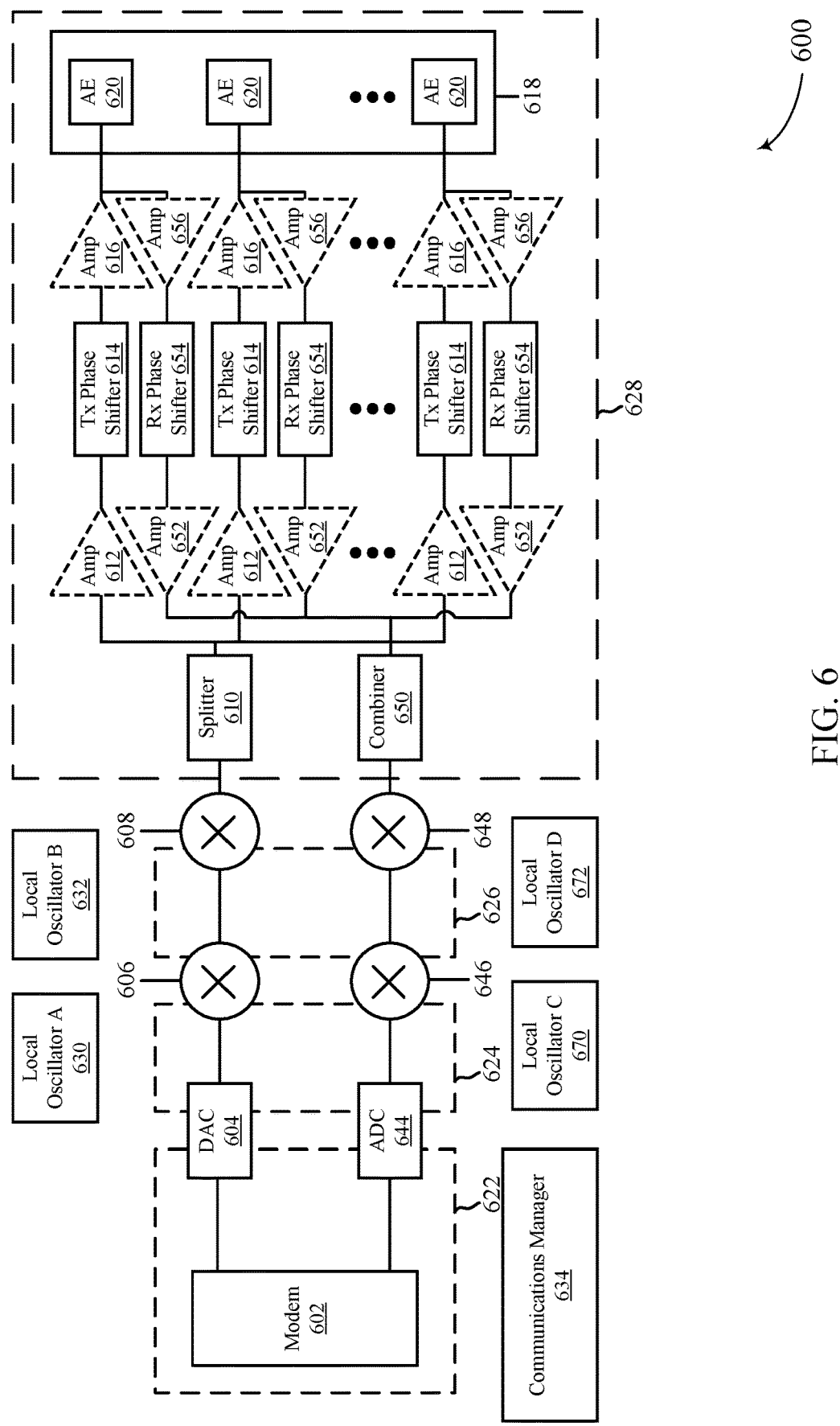
FIG. 6 illustrates an example of an architecture that supports techniques for updating reference signals in accordance with aspects of the present disclosure.

FIG. 6 illustrates an example of an architecture 600 that supports techniques for updating reference signals in accordance with aspects of the present disclosure. In some examples, Architecture 600 may implement aspects of wireless communications system 100 and or 200. In some cases, architecture 600 may be an example of a transmitting device (e.g., a first wireless device, such as a UE 115 or base station 105) and/or a receiving device (e.g., a second wireless device, such as a UE 115 or base station 105) as described herein.

FIG. 6 illustrates example hardware components of a wireless device in accordance with one or more aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 600 includes a modem (modulator/demodulator) 602, a digital to analog converter (DAC) 604, a first mixer 606, a second mixer 608, and a splitter 610. The architecture 600 also includes a plurality of first amplifiers 612, a plurality of phase shifters 614, a plurality of second amplifiers 616, and an antenna array 618 that includes a plurality of antenna elements 620. Transmission lines or other waveguides, wires, traces, or the like are shown connecting the various components to illustrate how signals to be transmitted may travel between components. Boxes 622, 624, 626, and 628 indicate regions in the architecture 600 in which different types of signals travel or are processed. Specifically, box 622 indicates a region in which digital baseband signals travel or are processed, box 624 indicates a region in which analog baseband signals travel or are processed, box 626 indicates a region in which analog intermediate frequency (IF) signals travel or are processed, and box 628 indicates a region in which analog radio frequency (RF) signals travel or are processed. The architecture also includes a local oscillator A 630, a local oscillator B 632, and a communications manager 634.

Each of the antenna elements 620 may include one or more sub-elements (not shown) for radiating or receiving RF signals. For example, a single antenna element 620 may include a first sub-element cross-polarized with a second sub-element that can be used to independently transmit cross-polarized signals. The antenna elements 620 may include patch antennas or other types of antennas arranged in a linear, two dimensional, or other pattern. A spacing between antenna elements 620 may be such that signals with a desired wavelength transmitted separately by the antenna elements 620 may interact or interfere (e.g., to form a desired beam). For example, given an expected range of wavelengths or frequencies, the spacing may provide a quarter wavelength, half wavelength, or other fraction of a wavelength of spacing between neighboring antenna elements 620 to allow for interaction or interference of signals transmitted by the separate antenna elements 620 within that expected range.

The modem 602 processes and generates digital baseband signals and may also control operation of the DAC 604, first and second mixers 606, 608, splitter 610, first amplifiers 612, phase shifters 614, and/or the second amplifiers 616 to transmit signals via one or more or all of the antenna elements 620. The modem 602 may process signals and control operation in accordance with a communication standard such as a wireless standard discussed herein. The DAC 604 may convert digital baseband signals received from the modem 602 (and that are to be transmitted) into analog baseband signals. The first mixer 606 upconverts analog baseband signals to analog IF signals within an IF using a local oscillator A 630. For example, the first mixer 606 may mix the signals with an oscillating signal generated by the local oscillator A 630 to "move" the baseband analog signals to the IF. In some cases some processing or filtering (not shown) may take place at the IF. The second mixer 608 upconverts the analog IF signals to analog RF signals using the local oscillator B 632. Similarly to the first mixer, the second mixer 608 may mix the signals with an oscillating signal generated by the local oscillator B 632 to "move" the IF analog signals to the RF, or the frequency at which signals will be transmitted or received. The modem 602 and/or the communications manager 634 may adjust the frequency of local oscillator A 630 and/or the local oscillator B 632 so that a desired IF and/or RF frequency is produced and used to facilitate processing and transmission of a signal within a desired bandwidth.

In the illustrated architecture 600, signals upconverted by the second mixer 608 are split or duplicated into multiple signals by the splitter 610. The splitter 610 in architecture 600 splits the RF signal into a plurality of identical or nearly identical RF signals, as denoted by its presence in box 628. In other examples, the split may take place with any type of signal including with baseband digital, baseband analog, or IF analog signals. Each of these signals may correspond to an antenna element 620 and the signal travels through and is processed by amplifiers 612, 616, phase shifters 614, and/or other elements corresponding to the respective antenna element 620 to be provided to and transmitted by the corresponding antenna element 620 of the antenna array 618. In one example, the splitter 610 may be an active splitter that is connected to a power supply and provides some gain so that RF signals exiting the splitter 610 are at a power level equal to or greater than the signal entering the splitter 610. In another example, the splitter 610 is a passive splitter that is not connected to power supply and the RF signals exiting the splitter 610 may be at a power level lower than the RF signal entering the splitter 610.

After being split by the splitter 610, the resulting RF signals may enter an amplifier, such as a first amplifier 612, or a phase shifter 614 corresponding to an antenna element 620. The first and second amplifiers 612, 616 are illustrated with dashed lines because one or both of them might not be necessary in some implementations. In one implementation, both the first amplifier 612 and second amplifier 614 are present. In another, neither the first amplifier 612 nor the second amplifier 614 is present. In other implementations, one of the two amplifiers 612, 614 is present but not the other. By way of example, if the splitter 610 is an active splitter, the first amplifier 612 may not be used. By way of further example, if the phase shifter 614 is an active phase shifter that can provide a gain, the second amplifier 616 might not be used.

The amplifiers 612, 616 may provide a desired level of positive or negative gain. A positive gain (positive dB) may be used to increase an amplitude of a signal for radiation by a specific antenna element 620. A negative gain (negative dB) may be used to decrease an amplitude and/or suppress radiation of the signal by a specific antenna element. Each of the amplifiers 612, 616 may be controlled independently (e.g., by the modem 602 or communications manager 634) to provide independent control of the gain for each antenna element 620. For example, the modem 602 and/or the communications manager 634 may have at least one control line connected to each of the splitter 610, first amplifiers 612, phase shifters 614, and/or second amplifiers 616 which may be used to configure a gain to provide a desired amount of gain for each component and thus each antenna element 620.

The phase shifter 614 may provide a configurable phase shift or phase offset to a corresponding RF signal to be transmitted. The phase shifter 614 could be a passive phase shifter not directly connected to a power supply. Passive phase shifters might introduce some insertion loss. The second amplifier 616 could boost the signal to compensate for the insertion loss. The phase shifter 614 could be an active phase shifter connected to a power supply such that the active phase shifter provides some amount of gain or prevents insertion loss. The settings of each of the phase shifters 614 are independent meaning that each can be set to provide a desired amount of phase shift or the same amount of phase shift or some other configuration. The modem 602 and/or the communications manager 634 may have at least one control line connected to each of the phase shifters 614 and which may be used to configure the phase shifters 614 to provide a desired amounts of phase shift or phase offset between antenna elements 620.

In the illustrated architecture 600, RF signals received by the antenna elements 620 are provided to one or more of first amplifier 656 to boost the signal strength. The first amplifier 656 may be connected to the same antenna arrays 618, e.g., for TDD operations. The first amplifier 656 may be connected to different antenna arrays 618. The boosted RF signal is input into one or more of phase shifter 654 to provide a configurable phase shift or phase offset for the corresponding received RF signal. The phase shifter 654 may be an active phase shifter or a passive phase shifter. The settings of the phase shifters 654 are independent, meaning that each can be set to provide a desired amount of phase shift or the same amount of phase shift or some other configuration. The modem 602 and/or the communications manager 634 may have at least one control line connected to each of the phase shifters 654 and which may be used to configure the phase sifters 654 to provide a desired amount of phase shift or phase offset between antenna elements 620.

The outputs of the phase shifters 654 may be input to one or more second amplifiers 652 for signal amplification of the phase shifted received RF signals. The second amplifiers 652 may be individually configured to provide a configured amount of gain. The second amplifiers 652 may be individually configured to provide an amount of gain to ensure that the signal input to combiner 650 have the same magnitude. The amplifiers 652 and/or 656 are illustrated in dashed lines because they might not be necessary in some implementations. In one implementation, both the amplifier 652 and the amplifier 656 are present. In another, neither the amplifier 652 nor the amplifier 656 are present. In other implementations, one of the amplifiers 652, 656 is present but not the other.

In the illustrated architecture 600, signals output by the phase shifters 654 (via the amplifiers 652 when present) are combined in combiner 650. The combiner 650 in architecture combines the RF signal into a signal, as denoted by its presence in box 628. The combiner 650 may be a passive combiner, e.g., not connected to a power source, which may result in some insertion loss. The combiner 650 may be an active combiner, e.g., connected to a power source, which may result in some signal gain. When combiner 650 is an active combiner, it may provide a different (e.g., configurable) amount of gain for each input signal so that the input signals have the same magnitude when they are combined. When combiner 650 is an active combiner, it may not need the second amplifier 652 because the active combiner may provide the signal amplification.

The output of the combiner 650 is input into mixers 648 and 646. Mixers 648 and 646 generally down convert the received RF signal using inputs from local oscillators 672 and 670, respectively, to create intermediate or baseband signals that carry the encoded and modulated information. The output of the mixers 648 and 646 are input into an analog-to-digital converter (ADC) 644 for conversion to analog signals. The analog signals output from ADC 644 is input to modem 602 for baseband processing, e.g., decoding, de-interleaving, etc.

The architecture 600 is given by way of example to illustrate an architecture for transmitting and/or receiving signals. It will be understood that the architecture 600 and/or each portion of the architecture 600 may be repeated multiple times within an architecture to accommodate or provide an arbitrary number of RF chains, antenna elements, and/or antenna panels. Furthermore, numerous alternate architectures are possible and contemplated. For example, although a single antenna array 618 is shown, two, three, or more antenna arrays may be included each with one or more of their own corresponding amplifiers, phase shifters, splitters, mixers, DACs, ADCs, and/or modems. For example, a single UE 115 may include two, four, or more antenna arrays for transmitting or receiving signals at different physical locations on the UE 115 or in different directions.

Further, mixers, splitters, amplifiers, phase shifters and other components may be located in different signal type areas (e.g., different ones of the boxes 622, 624, 626, 628) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 610, amplifiers 612, 616, or phase shifters 614 may be located between the DAC 604 and the first mixer 606 or between the first mixer 606 and the second mixer 608. In one example, the functions of one or more of the components may be combined into one component. For example, the phase shifters 614 may perform amplification to include or replace the first and/or or second amplifiers 612, 616. By way of another example, the second mixer 608 may implement a phase shift to obviate the need for a separate phase shifter 614. This technique may sometimes be called local oscillator (LO) phase shifting. In one implementation of this configuration, there may be a plurality of IF to RF mixers (e.g., for each antenna element chain) within the second mixer 608 and the local oscillator B 632 would supply different local oscillator signals (with different phase offsets) to each IF to RF mixer.

The modem 602 and/or the communications manager 634 may control one or more of the other components 604-472 to select one or more antenna elements 620 and/or to form beams for transmission of one or more signals. For example, the antenna elements 620 may be individually selected or deselected for transmission of a signal (or signals) by controlling an amplitude of one or more corresponding amplifiers, such as the first amplifiers 612 and/or the second amplifiers 616. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 620, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 618) can be dynamically controlled by modifying the phase shifts or phase offsets imparted by the phase shifters 614 and amplitudes imparted by the amplifiers 612, 616 of the plurality of signals relative to each other.

In some examples, the communications manager 634 may, when architecture 600 is configured as a receiving device, identify a configuration of a first QCL parameter associated with a control resource set and a reference signal. The communications manager 634 may receive, via one or more of a MAC-CE or DCI, an updated configuration for the reference signal based on the first QCL parameter associated with the control resource set changing. In such cases, the updated configuration may indicate that a second QCL parameter is configured for the reference signal. In another example, the communications manager 634 may receive a first message that indicates a first set of reference signal resources configured for a path loss reference signal. The communications manager 634 may also receive, based on the first set of reference signal resources changing, a second message that indicates a second set of reference signal resources configured for the path loss reference signal, where the second message includes one or more of a MAC-CE or DCI. In some cases, the communications manager 634 may receive a message indicating a spatial relation reference signal associated with an uplink beam. The communications manager 634 may determine whether a path loss reference signal corresponding to the uplink beam is configured. Further, the communications manager 634 may monitor the spatial relation reference signal for path loss estimation based on a determination that the path loss reference signal is not configured.

Additionally or alternatively, when architecture 600 is configured as a transmitting device, the communications manager 634 may determine a configuration of a first QCL parameter associated with a control resource set and a reference signal. In some cases, communications manager 634 may determine that the first QCL parameter associated with the control resource set has changed to a second QCL parameter different from the first QCL parameter. The communications manager 634 may identify an updated configuration of the reference signal based on the first QCL parameter associated with the control resource set changing, where the updated configuration configures the reference signal with the second QCL parameter. The communications manager 634 may transmit, via one or more of a MAC-CE or DCI, the updated configuration of the reference signal.

In some examples, the communications manager 634 may transmit a first message that indicates a first set of reference signal resources configured for a path loss reference signal. the communications manager 634 may determine that the first set of reference signal resources has changed to a second set of reference signal resources, and transmit, based on the first set of reference signal resources changing, a second message that indicates the second set of reference signal resources configured for the path loss reference signal. In such cases, the second message may include one or more of a MAC-CE or DCI. In some aspects, the communications manager 634 may transmit a message indicating a spatial relation reference signal associated with an uplink beam. The communications manager 634 may determine that a path loss reference signal corresponding to the uplink beam is not configured, where the spatial relation reference signal is used for path loss estimation based on the determination.

The communications manager 634 may be located partially or fully within one or more other components of the architecture 600. For example, the communications manager 634 may be located within the modem 602 in at least one implementation.

Figure 7:
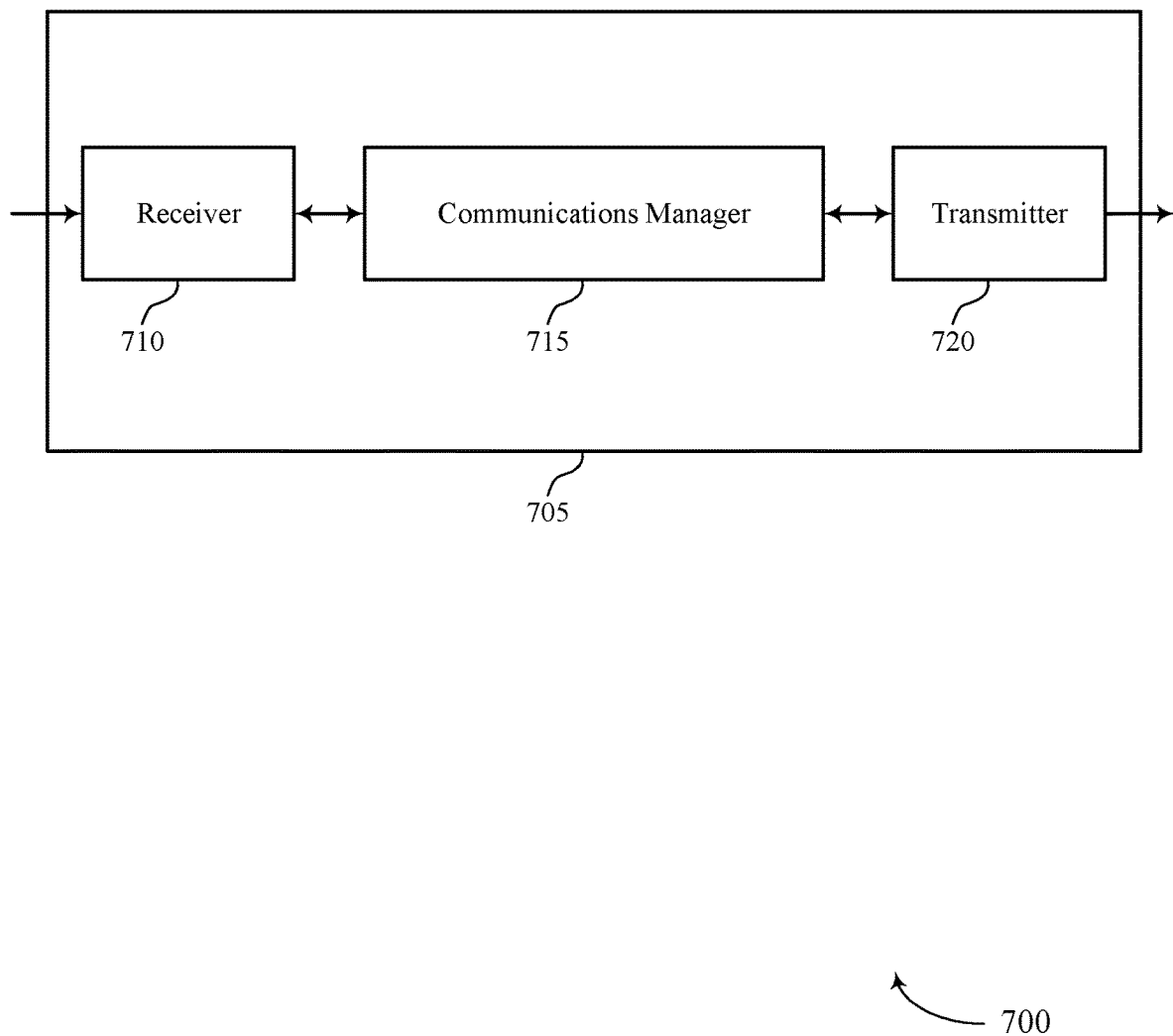
FIGS. 7 and 8 show block diagrams of devices that support techniques for updating reference signals in accordance with aspects of the present disclosure.

FIG. 7 shows a block diagram 700 of a device 705 that supports techniques for updating reference signals in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for updating reference signals, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a configuration of a first QCL parameter associated with a control resource set and a reference signal and receive, via one or more of a MAC-CE or DCI, an updated configuration for the reference signal based on the first QCL parameter associated with the control resource set changing, the updated configuration indicating that a second QCL parameter is configured for the reference signal.

The communications manager 715 may also receive a first message that indicates a first set of reference signal resources configured for a path loss reference signal and receive, based on the first set of reference signal resources changing, a second message that indicates a second set of reference signal resources configured for the path loss reference signal, where the second message includes one or more of a MAC-CE or DCI. The communications manager 715 may also receive a message indicating a spatial relation reference signal associated with an uplink beam, determine whether a path loss reference signal corresponding to the uplink beam is configured, and monitor the spatial relation reference signal for path loss estimation based on a determination that the path loss reference signal is not configured. The communications manager 715 may be an example of aspects of the communications manager 634 and/or the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
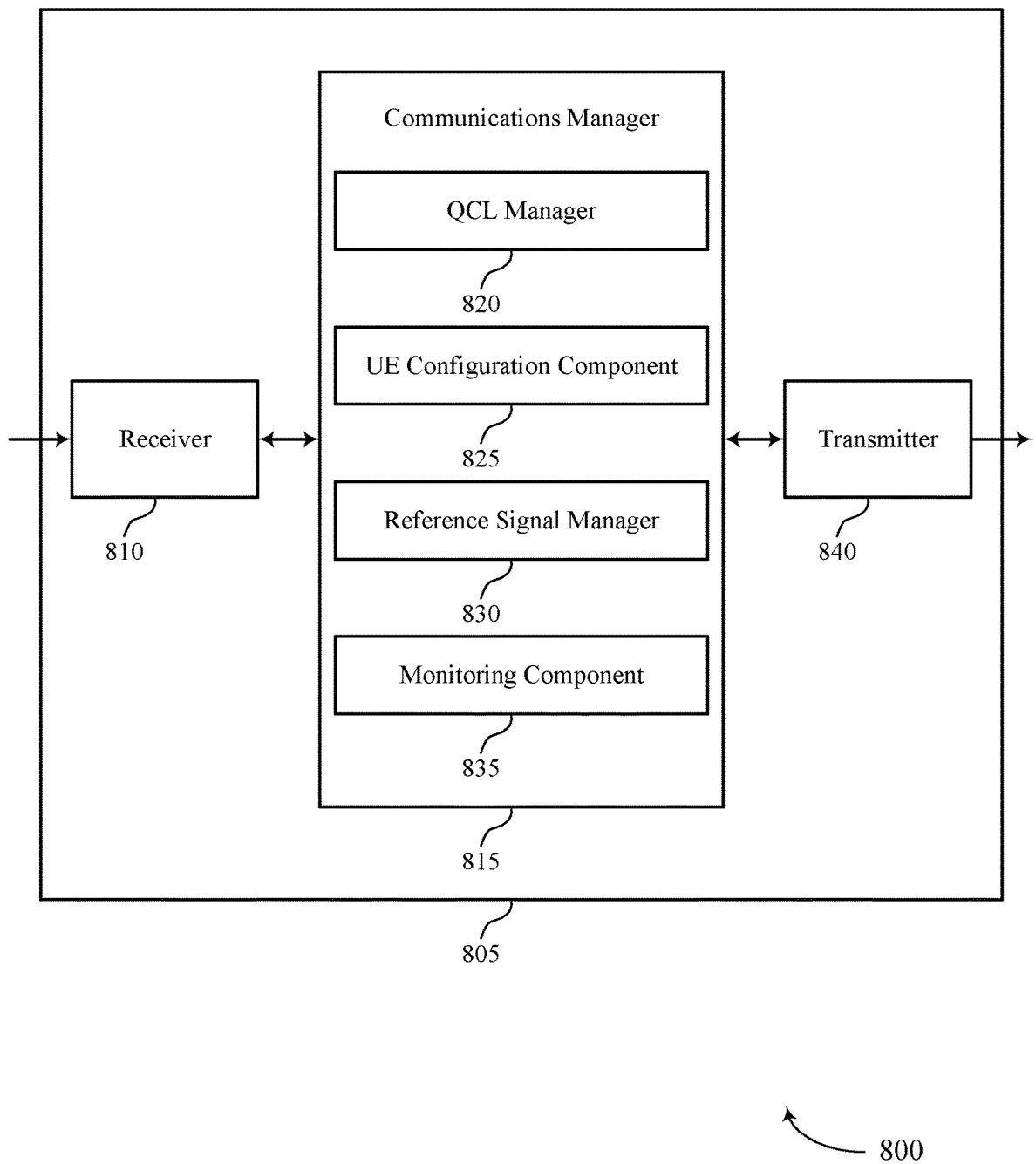

FIG. 8 shows a block diagram 800 of a device 805 that supports techniques for updating reference signals in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to techniques for updating reference signals, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a QCL manager 820, a UE configuration component 825, a reference signal manager 830, and a monitoring component 835. The communications manager 815 may be an example of aspects of the communications manager 1010 described herein.

The QCL manager 820 may identify a configuration of a first QCL parameter associated with a control resource set and a reference signal. The UE configuration component 825 may receive, via one or more of a MAC-CE or DCI, an updated configuration for the reference signal based on the first QCL parameter associated with the control resource set changing, the updated configuration indicating that a second QCL parameter is configured for the reference signal.

The reference signal manager 830 may receive a first message that indicates a first set of reference signal resources configured for a path loss reference signal. The UE configuration component 825 may receive, based on the first set of reference signal resources changing, a second message that indicates a second set of reference signal resources configured for the path loss reference signal, where the second message includes one or more of a MAC-CE or DCI.

The reference signal manager 830 may receive a message indicating a spatial relation reference signal associated with an uplink beam. The UE configuration component 825 may determine whether a path loss reference signal corresponding to the uplink beam is configured. The monitoring component 835 may monitor the spatial relation reference signal for path loss estimation based on a determination that the path loss reference signal is not configured.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
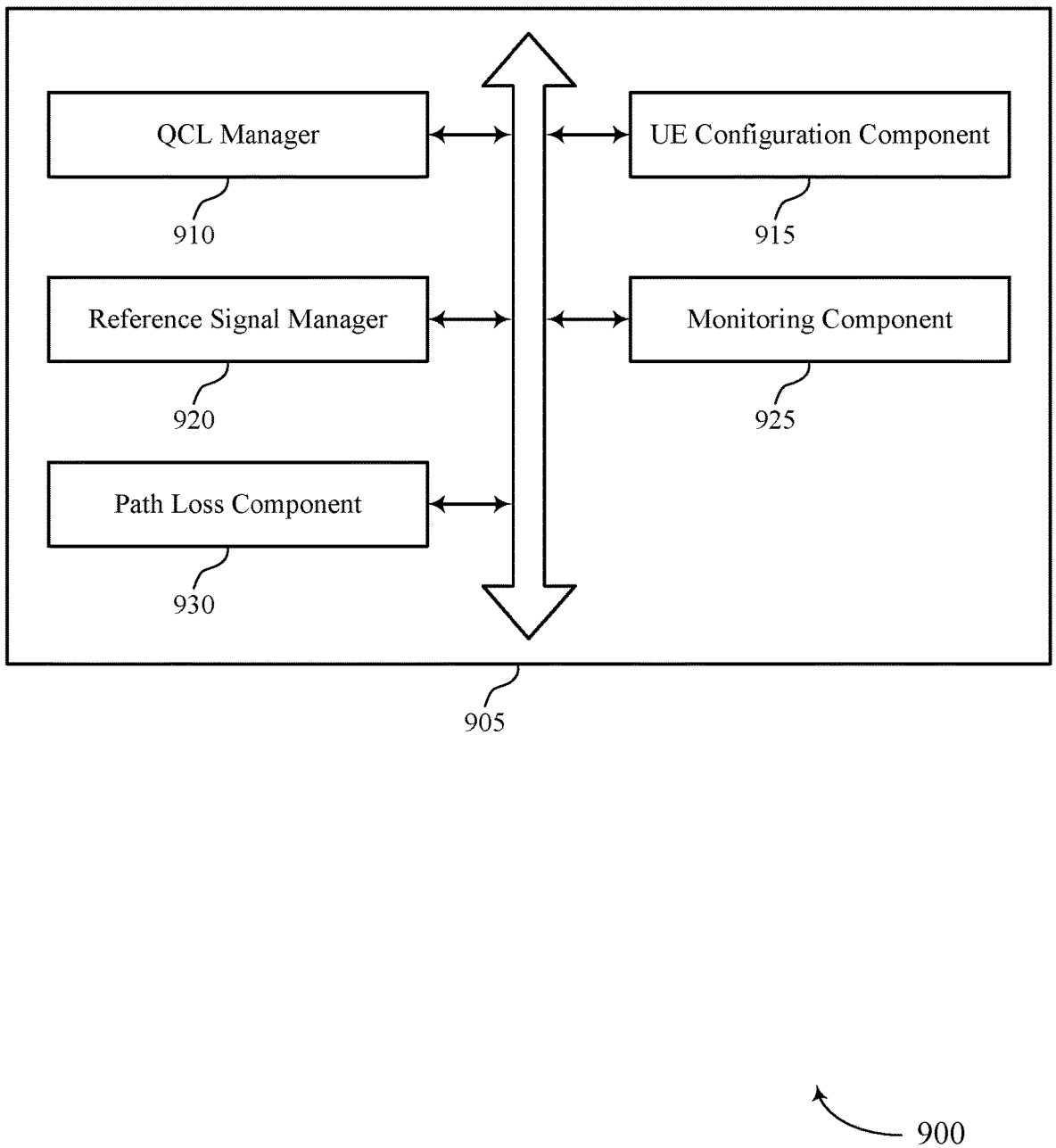
FIG. 9 shows a block diagram of a communications manager that supports techniques for updating reference signals in accordance with aspects of the present disclosure.

FIG. 9 shows a block diagram 900 of a communications manager 905 that supports techniques for updating reference signals in accordance with aspects of the present disclosure. The communications manager 905 may be an example of aspects of a communications manager 715, a communications manager 815, or a communications manager 1010 described herein. The communications manager 905 may include a QCL manager 910, a UE configuration component 915, a reference signal manager 920, a monitoring component 925, and a path loss component 930. Each of these modules may communicate, directly or indirectly, with one another (e.g., via one or more buses).

The QCL manager 910 may identify a configuration of a first QCL parameter associated with a control resource set and a reference signal. In some examples, the QCL manager 910 may determine that the first QCL parameter associated with the control resource set has changed to the second QCL parameter.

The UE configuration component 915 may receive, via one or more of a MAC-CE or DCI, an updated configuration for the reference signal based on the first QCL parameter associated with the control resource set changing, the updated configuration indicating that a second QCL parameter is configured for the reference signal. In some examples, receiving, based on the first set of reference signal resources changing, a second message that indicates a second set of reference signal resources configured for the path loss reference signal, where the second message includes one or more of a MAC-CE or DCI.

In some examples, the UE configuration component 915 may determine whether a path loss reference signal corresponding to the uplink beam is configured. In some examples, the UE configuration component 915 may identify the updated configuration based on a format of the DCI. In some examples, the UE configuration component 915 may receive an RRC message including the configuration of the reference signal, where the first QCL parameter is indicated by a transmission configuration indicator state identifier within the RRC message. In some cases, the configuration indicates that the reference signal includes the semi-persistent CSI-RS or the aperiodic CSI-RS for beam failure detection.

The reference signal manager 920 may receive a first message that indicates a first set of reference signal resources configured for a path loss reference signal. In some examples, the reference signal manager 920 may receive a message indicating a spatial relation reference signal associated with an uplink beam. In some examples, determining that the reference signal includes a periodic CSI-RS for beam failure detection. In some examples, determining that the reference signal includes one or more of a semi-persistent CSI-RS or an aperiodic CSI-RS for beam failure detection.

In some examples, the reference signal manager 920 may overwrite the first set of reference signal resources with the second set of reference signal resources based on receiving the second message. In some examples, determining that the spatial relation reference signal includes the path loss reference signal based on the determination that the path loss reference signal is not configured, where the path loss estimation is for uplink power control.

In some cases, the reference signal includes one or more of a beam failure detection reference signal, a periodic CSI-RS, or a time/frequency tracking reference signal. In some cases, the first message includes an RRC message for uplink power control. In some cases, the uplink power control includes one of more of physical uplink control channel power control, physical uplink shared channel power control, or SRS power control. In some cases, the spatial relation reference signal corresponds to a set of physical uplink control channel resources.

In some cases, the spatial relation reference signal corresponds to a set of SRS resources indicated by an SRS resource indicator. In some cases, the uplink power control includes one of more of physical uplink control channel power control, physical uplink shared channel power control, or SRS power control. In some cases, the spatial relation reference signal includes one or more of a synchronization signal block, a CSI-RS, or an SRS.

The monitoring component 925 may monitor the spatial relation reference signal for path loss estimation based on a determination that the path loss reference signal is not configured. In some examples, the monitoring component 925 may monitor for the reference signal based on the second QCL parameter. The path loss component 930 may estimate a path loss for an uplink bandwidth part based on the second set of reference signal resources associated with the path loss reference signal. In some cases, the path loss reference signal includes one or more of a CSI-RS or a synchronization signal block.

Figure 10:
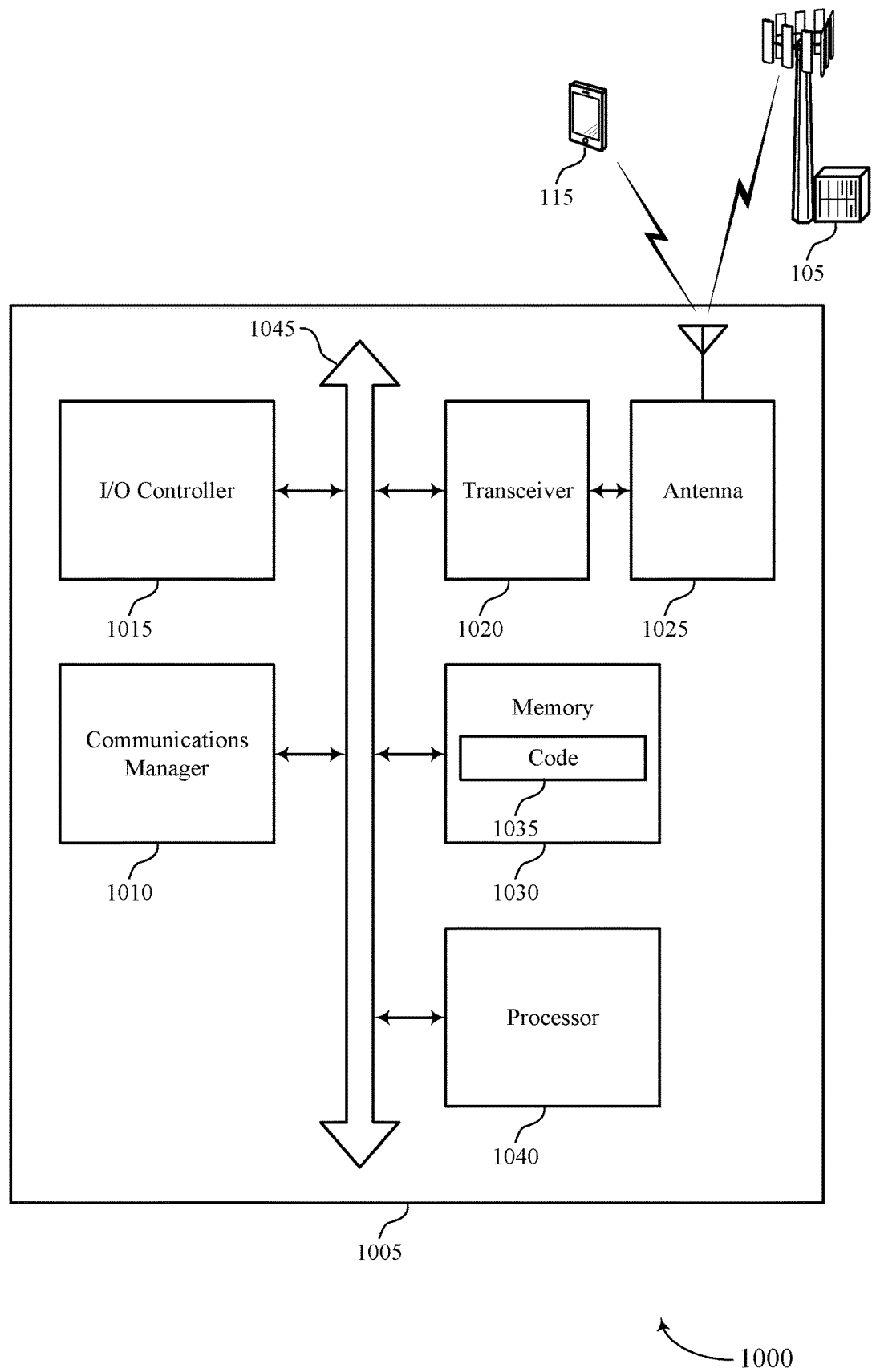
FIG. 10 shows a diagram of a system including a device that supports techniques for updating reference signals in accordance with aspects of the present disclosure.

FIG. 10 shows a diagram of a system 1000 including a device 1005 that supports techniques for updating reference signals in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a configuration of a first QCL parameter associated with a control resource set and a reference signal and receive, via one or more of a MAC-CE or DCI, an updated configuration for the reference signal based on the first QCL parameter associated with the control resource set changing, the updated configuration indicating that a second QCL parameter is configured for the reference signal.

The communications manager 1010 may also receive a first message that indicates a first set of reference signal resources configured for a path loss reference signal and receive, based on the first set of reference signal resources changing, a second message that indicates a second set of reference signal resources configured for the path loss reference signal, where the second message includes one or more of a MAC-CE or DCI. The communications manager 1010 may also receive a message indicating a spatial relation reference signal associated with an uplink beam, determine whether a path loss reference signal corresponding to the uplink beam is configured, and monitor the spatial relation reference signal for path loss estimation based on a determination that the path loss reference signal is not configured.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for updating reference signals).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
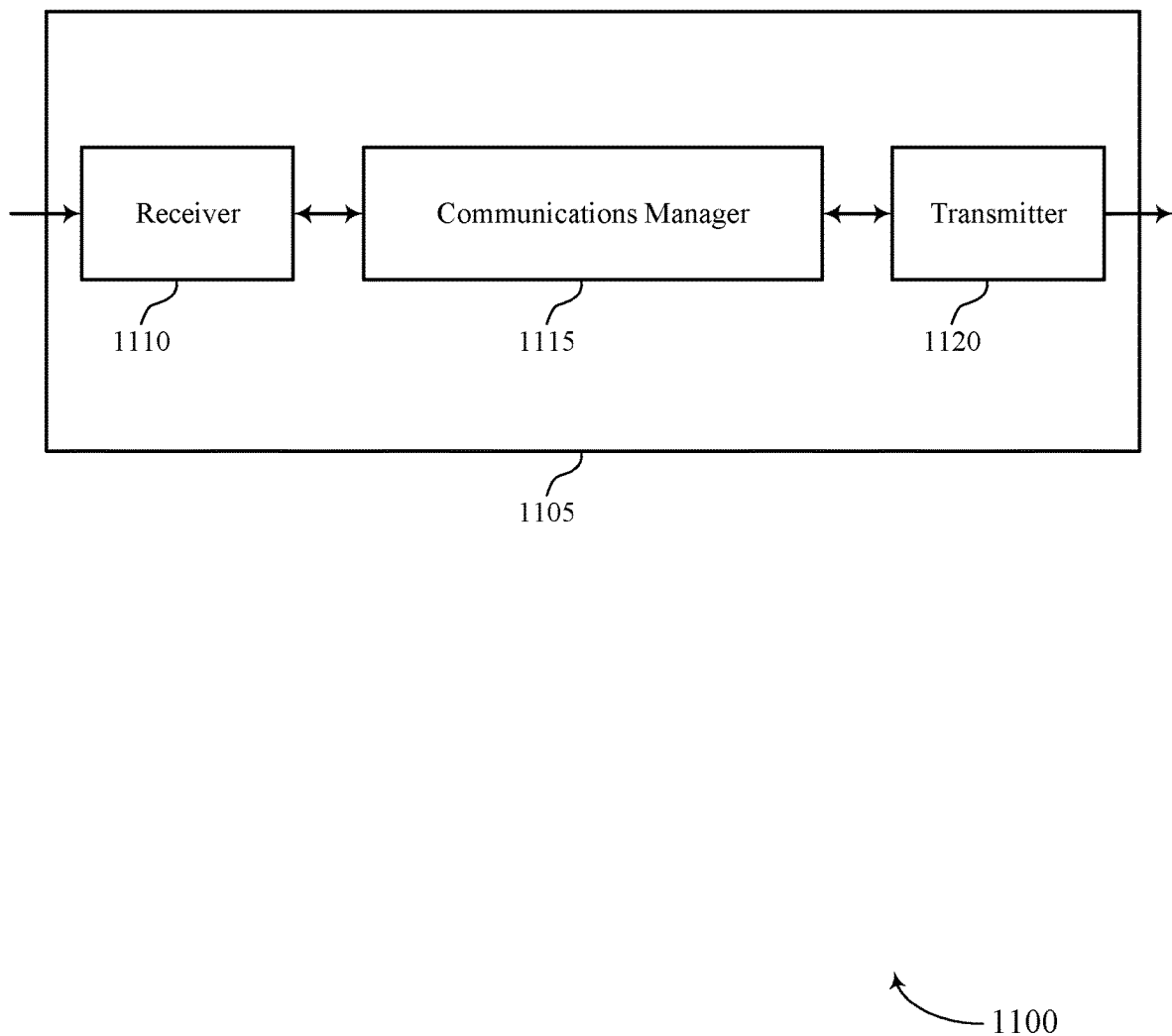
FIGS. 11 and 12 show block diagrams of devices that support techniques for updating reference signals in accordance with aspects of the present disclosure.

FIG. 11 shows a block diagram 1100 of a device 1105 that supports techniques for updating reference signals in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for updating reference signals, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine a configuration of a first QCL parameter associated with a control resource set and a reference signal, determine that the first QCL parameter associated with the control resource set has changed to a second QCL parameter different from the first QCL parameter, identify an updated configuration of the reference signal based on the first QCL parameter associated with the control resource set changing, the updated configuration configuring the reference signal with the second QCL parameter, and transmit, via one or more of a MAC-CE or DCI, the updated configuration of the reference signal.

The communications manager 1115 may also transmit a first message that indicates a first set of reference signal resources configured for a path loss reference signal, determine that the first set of reference signal resources has changed to a second set of reference signal resources, and transmit, based on the first set of reference signal resources changing, a second message that indicates the second set of reference signal resources configured for the path loss reference signal, where the second message includes one or more of a MAC-CE or DCI. The communications manager 1115 may also transmit a message indicating a spatial relation reference signal associated with an uplink beam and determine that a path loss reference signal corresponding to the uplink beam is not configured, where the spatial relation reference signal is used for path loss estimation based on the determination. The communications manager 1115 may be an example of aspects of the communications manager 634 and/or the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
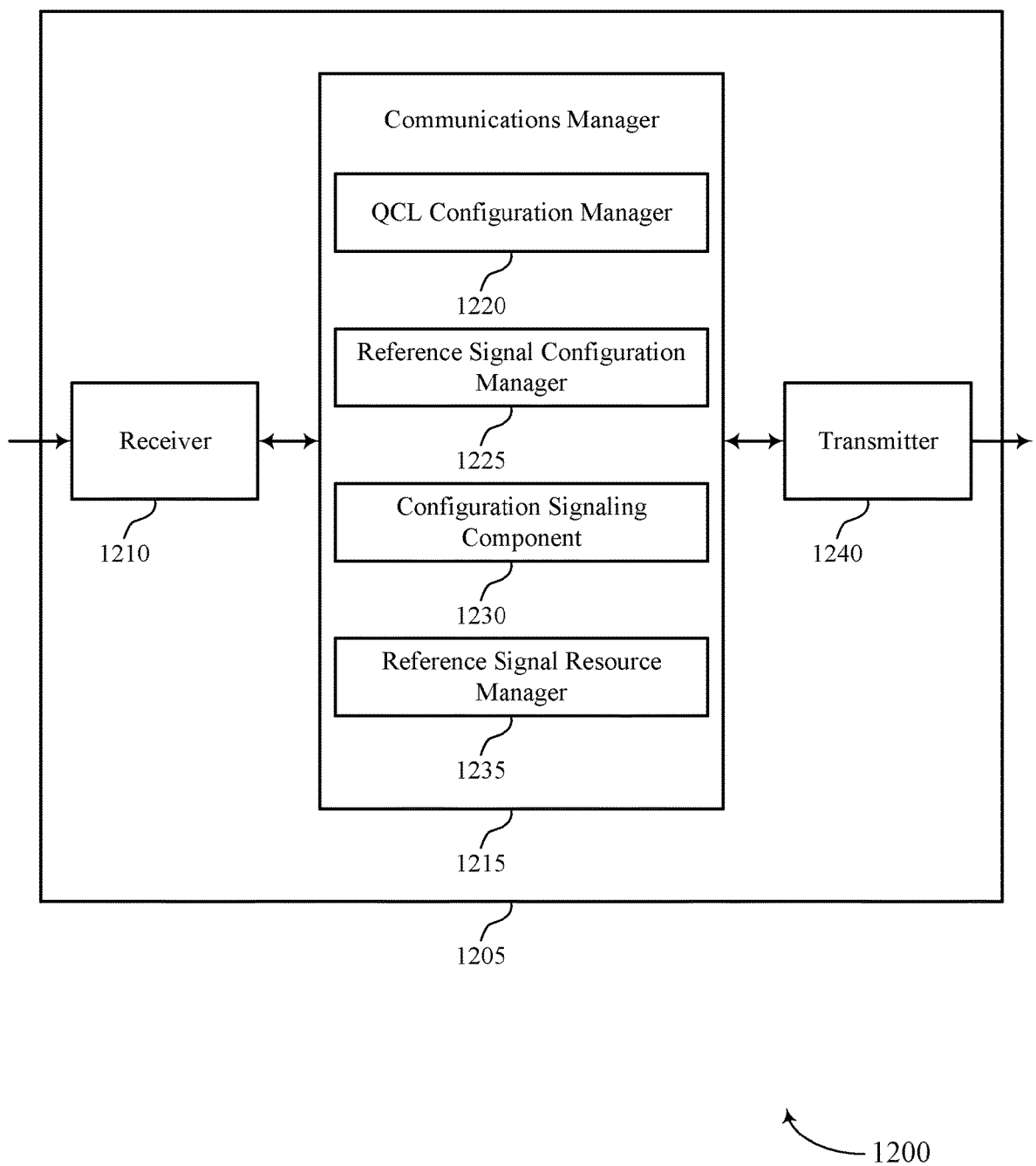

FIG. 12 shows a block diagram 1200 of a device 1205 that supports techniques for updating reference signals in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for updating reference signals, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a QCL configuration manager 1220, a reference signal configuration manager 1225, a configuration signaling component 1230, and a reference signal resource manager 1235. The communications manager 1215 may be an example of aspects of the communications manager 1410 described herein.

The QCL configuration manager 1220 may determine a configuration of a first QCL parameter associated with a control resource set and a reference signal and determine that the first QCL parameter associated with the control resource set has changed to a second QCL parameter different from the first QCL parameter.

The reference signal configuration manager 1225 may identify an updated configuration of the reference signal based on the first QCL parameter associated with the control resource set changing, the updated configuration configuring the reference signal with the second QCL parameter. The configuration signaling component 1230 may transmit, via one or more of a MAC-CE or DCI, the updated configuration of the reference signal.

The reference signal resource manager 1235 may transmit a first message that indicates a first set of reference signal resources configured for a path loss reference signal and determine that the first set of reference signal resources has changed to a second set of reference signal resources.

The configuration signaling component 1230 may transmit, based on the first set of reference signal resources changing, a second message that indicates the second set of reference signal resources configured for the path loss reference signal, where the second message includes one or more of a MAC-CE or DCI.

The configuration signaling component 1230 may transmit a message indicating a spatial relation reference signal associated with an uplink beam. The reference signal configuration manager 1225 may determine that a path loss reference signal corresponding to the uplink beam is not configured, where the spatial relation reference signal is used for path loss estimation based on the determination.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
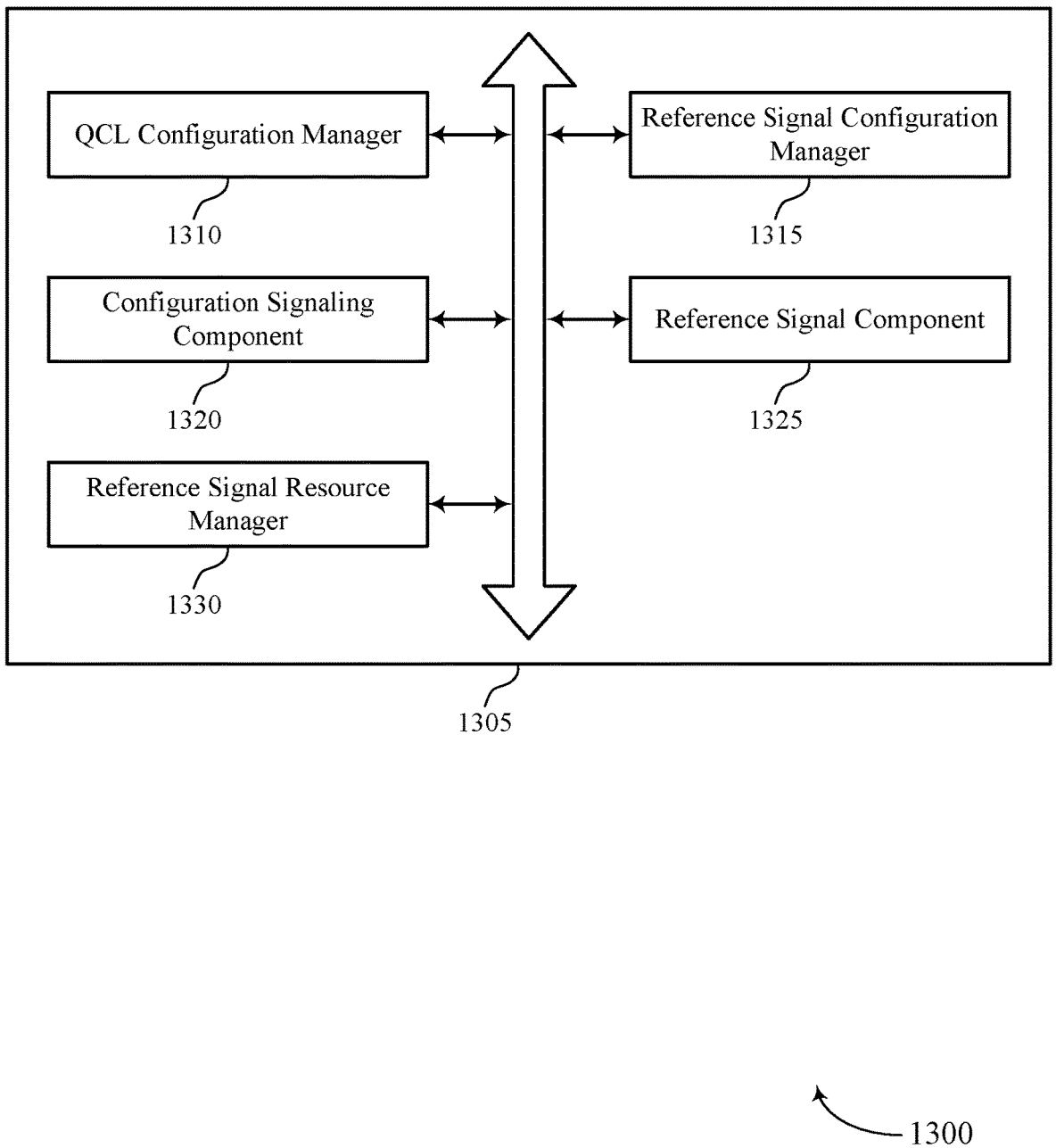
FIG. 13 shows a block diagram of a communications manager that supports techniques for updating reference signals in accordance with aspects of the present disclosure.

FIG. 13 shows a block diagram 1300 of a communications manager 1305 that supports techniques for updating reference signals in accordance with aspects of the present disclosure. The communications manager 1305 may be an example of aspects of a communications manager 1115, a communications manager 1215, or a communications manager 1410 described herein. The communications manager 1305 may include a QCL configuration manager 1310, a reference signal configuration manager 1315, a configuration signaling component 1320, a reference signal component 1325, and a reference signal resource manager 1330. Each of these modules may communicate, directly or indirectly, with one another (e.g., via one or more buses).

The QCL configuration manager 1310 may determine a configuration of a first QCL parameter associated with a control resource set and a reference signal. In some examples, the QCL configuration manager 1310 may determine that the first QCL parameter associated with the control resource set has changed to a second QCL parameter different from the first QCL parameter. In some cases, the reference signal includes one or more of a beam failure detection reference signal, a periodic CSI-RS, or a time/frequency tracking reference signal.

The reference signal configuration manager 1315 may identify an updated configuration of the reference signal based on the first QCL parameter associated with the control resource set changing, the updated configuration configuring the reference signal with the second QCL parameter. In some examples, the reference signal configuration manager 1315 may determine that a path loss reference signal corresponding to the uplink beam is not configured, where the spatial relation reference signal is used for path loss estimation based on the determination.

In some examples, the reference signal configuration manager 1315 may select a periodic CSI-RS as the reference signal, where the configuration indicates the periodic CSI-RS is for beam failure detection. In some examples, the reference signal configuration manager 1315 may select one or more of a semi-persistent CSI-RS or an aperiodic CSI-RS as the reference signal, where the configuration indicates that one or more of the semi-persistent CSI-RS or the aperiodic CSI-RS is for beam failure detection.

The configuration signaling component 1320 may transmit, via one or more of a MAC-CE or DCI, the updated configuration of the reference signal. In some examples, transmitting, based on the first set of reference signal resources changing, a second message that indicates the second set of reference signal resources configured for the path loss reference signal, where the second message includes one or more of a MAC-CE or DCI.

In some examples, the configuration signaling component 1320 may transmit a message indicating a spatial relation reference signal associated with an uplink beam. In some examples, the configuration signaling component 1320 may transmit an RRC message including the configuration of the reference signal, where the first QCL parameter is indicated by a transmission configuration indicator state identifier within the RRC message.

In some cases, a format of the DCI indicates the reference signal being configured with the second QCL parameter. In some cases, the spatial relation reference signal corresponds to a set of physical uplink control channel resources. In some cases, the spatial relation reference signal corresponds to a set of SRS resources indicated by an SRS resource indicator.

The reference signal resource manager 1330 may transmit a first message that indicates a first set of reference signal resources configured for a path loss reference signal. In some examples, the reference signal resource manager 1330 may determine that the first set of reference signal resources has changed to a second set of reference signal resources. In some cases, the second set of reference signal resources overwrites the first set of reference signal resources. In some cases, the first message includes an RRC message for uplink power control. In some cases, the uplink power control includes one of more of physical uplink control channel power control, physical uplink shared channel power control, or SRS power control. The reference signal component 1325 may transmit the reference signal in accordance with the updated configuration.

Figure 14:
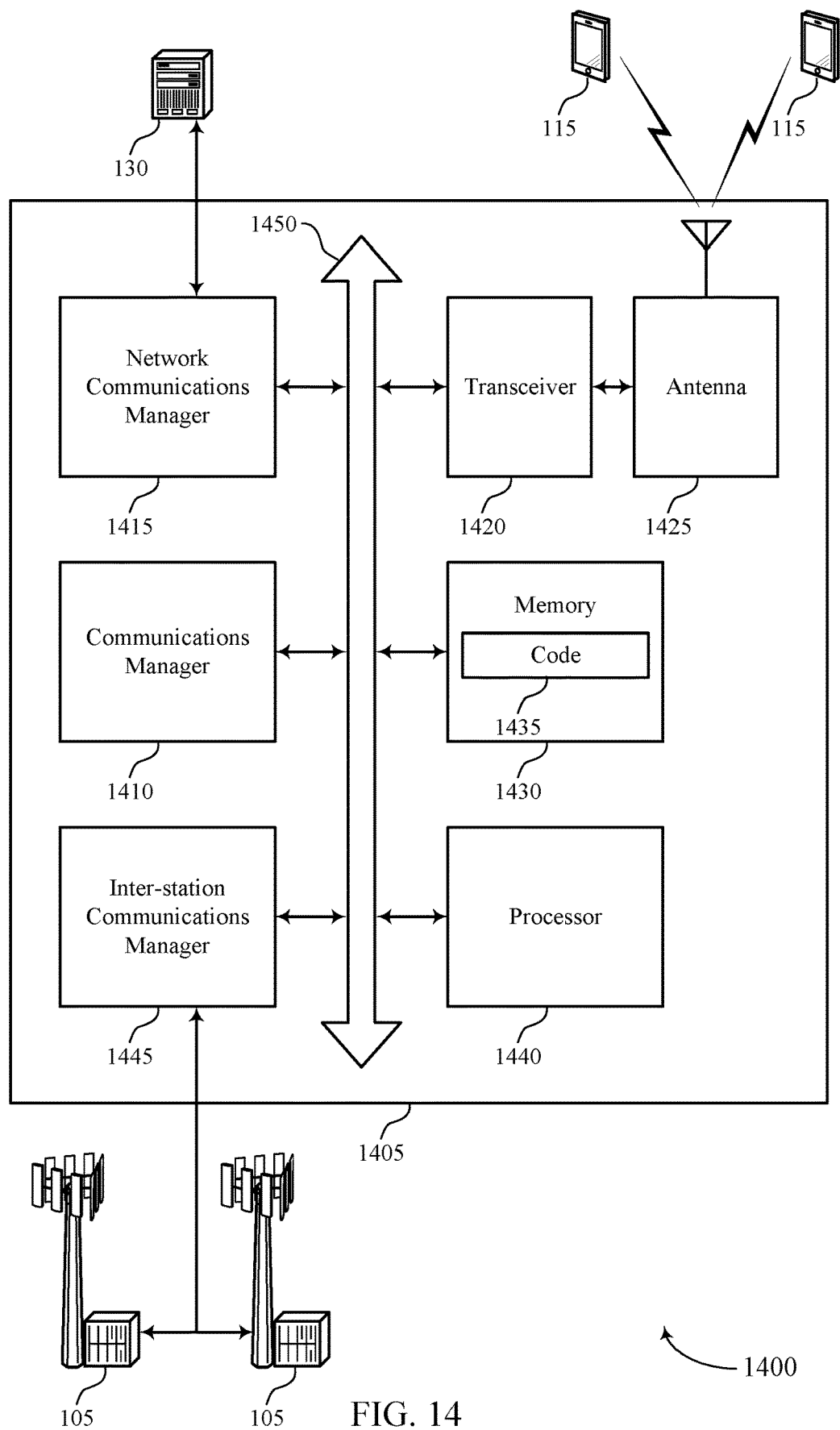
FIG. 14 shows a diagram of a system including a device that supports techniques for updating reference signals in accordance with aspects of the present disclosure.

FIG. 14 shows a diagram of a system 1400 including a device 1405 that supports techniques for updating reference signals in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine a configuration of a first QCL parameter associated with a control resource set and a reference signal, determine that the first QCL parameter associated with the control resource set has changed to a second QCL parameter different from the first QCL parameter, identify an updated configuration of the reference signal based on the first QCL parameter associated with the control resource set changing, the updated configuration configuring the reference signal with the second QCL parameter, and transmit, via one or more of a MAC-CE or DCI, the updated configuration of the reference signal.

The communications manager 1410 may also transmit a first message that indicates a first set of reference signal resources configured for a path loss reference signal, determine that the first set of reference signal resources has changed to a second set of reference signal resources, and transmit, based on the first set of reference signal resources changing, a second message that indicates the second set of reference signal resources configured for the path loss reference signal, where the second message includes one or more of a MAC-CE or DCI. The communications manager 1410 may also transmit a message indicating a spatial relation reference signal associated with an uplink beam and determine that a path loss reference signal corresponding to the uplink beam is not configured, where the spatial relation reference signal is used for path loss estimation based on the determination.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for updating reference signals).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
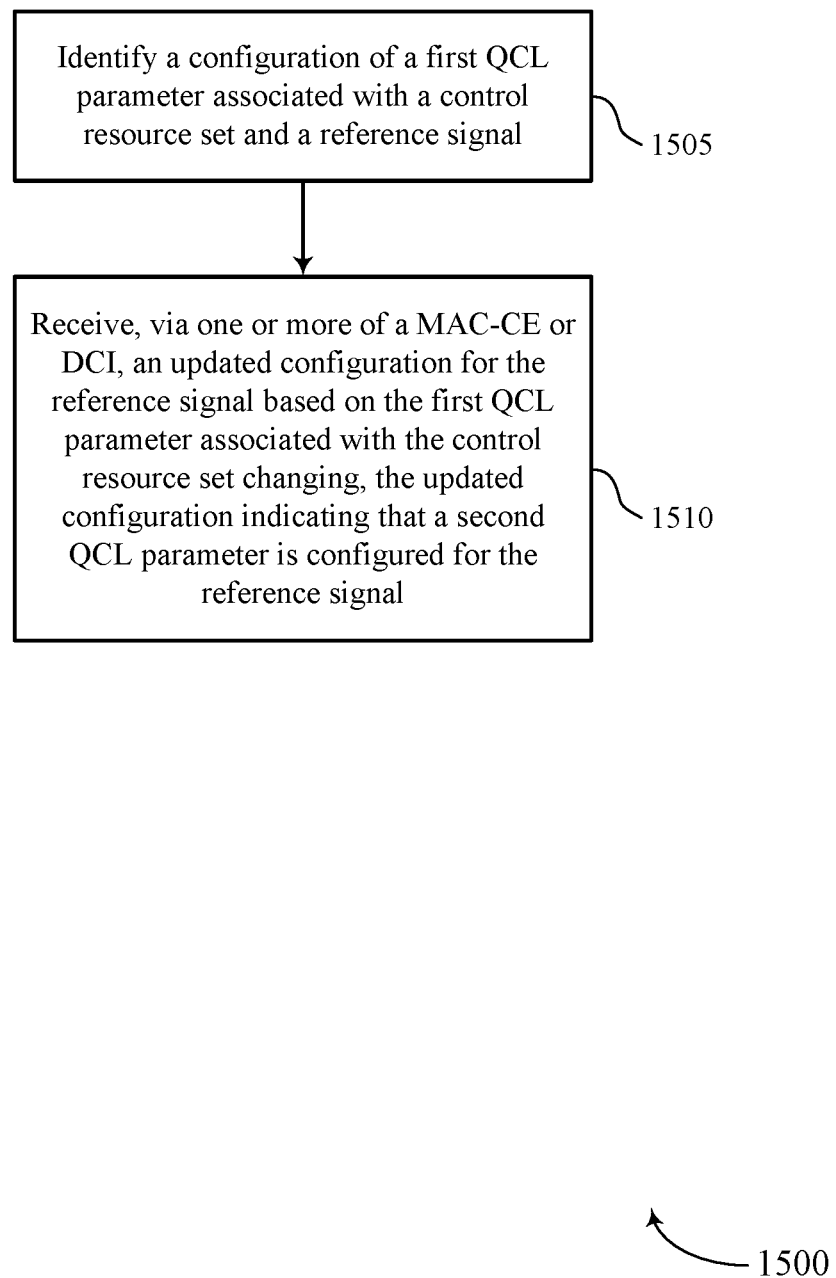
FIGS. 15 through 20 show flowcharts illustrating methods that support techniques for updating reference signals in accordance with aspects of the present disclosure.

FIG. 15 shows a flowchart illustrating a method 1500 that supports techniques for updating reference signals in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify a configuration of a first QCL parameter associated with a control resource set and a reference signal. The operations of 1505 may be performed according to the methods described herein. In some examples, aspects of the operations of 1505 may be performed by a QCL manager as described with reference to FIGS. 7 through 10.

At 1510, the UE may receive, via one or more of a MAC-CE or DCI, an updated configuration for the reference signal based on the first QCL parameter associated with the control resource set changing, the updated configuration indicating that a second QCL parameter is configured for the reference signal. The operations of 1510 may be performed according to the methods described herein. In some examples, aspects of the operations of 1510 may be performed by a UE configuration component as described with reference to FIGS. 7 through 10.

Figure 16:
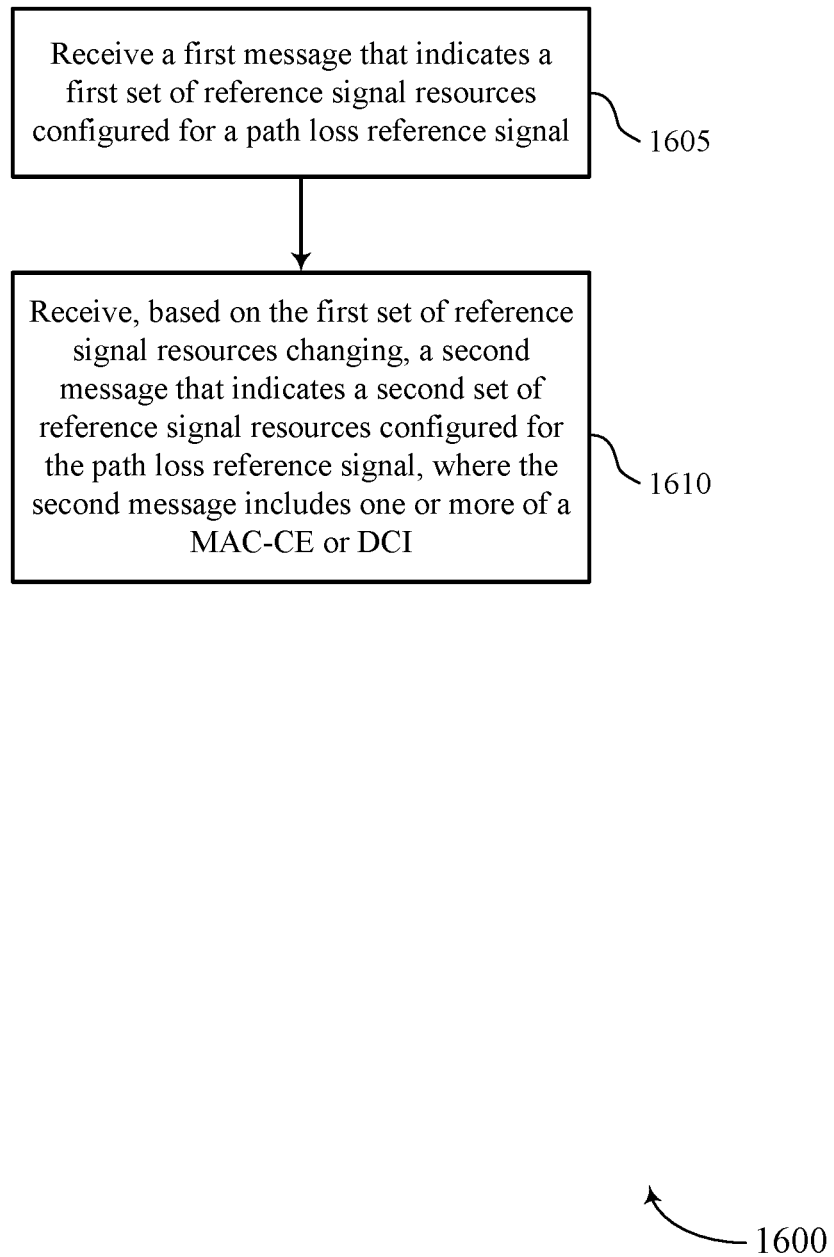

FIG. 16 shows a flowchart illustrating a method 1600 that supports techniques for updating reference signals in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a first message that indicates a first set of reference signal resources configured for a path loss reference signal. The operations of 1605 may be performed according to the methods described herein. In some examples, aspects of the operations of 1605 may be performed by a reference signal manager as described with reference to FIGS. 7 through 10.

At 1610, the UE may receive, based on the first set of reference signal resources changing, a second message that indicates a second set of reference signal resources configured for the path loss reference signal, where the second message includes one or more of a MAC-CE or DCI. The operations of 1610 may be performed according to the methods described herein. In some examples, aspects of the operations of 1610 may be performed by a UE configuration component as described with reference to FIGS. 7 through 10.

Figure 17:
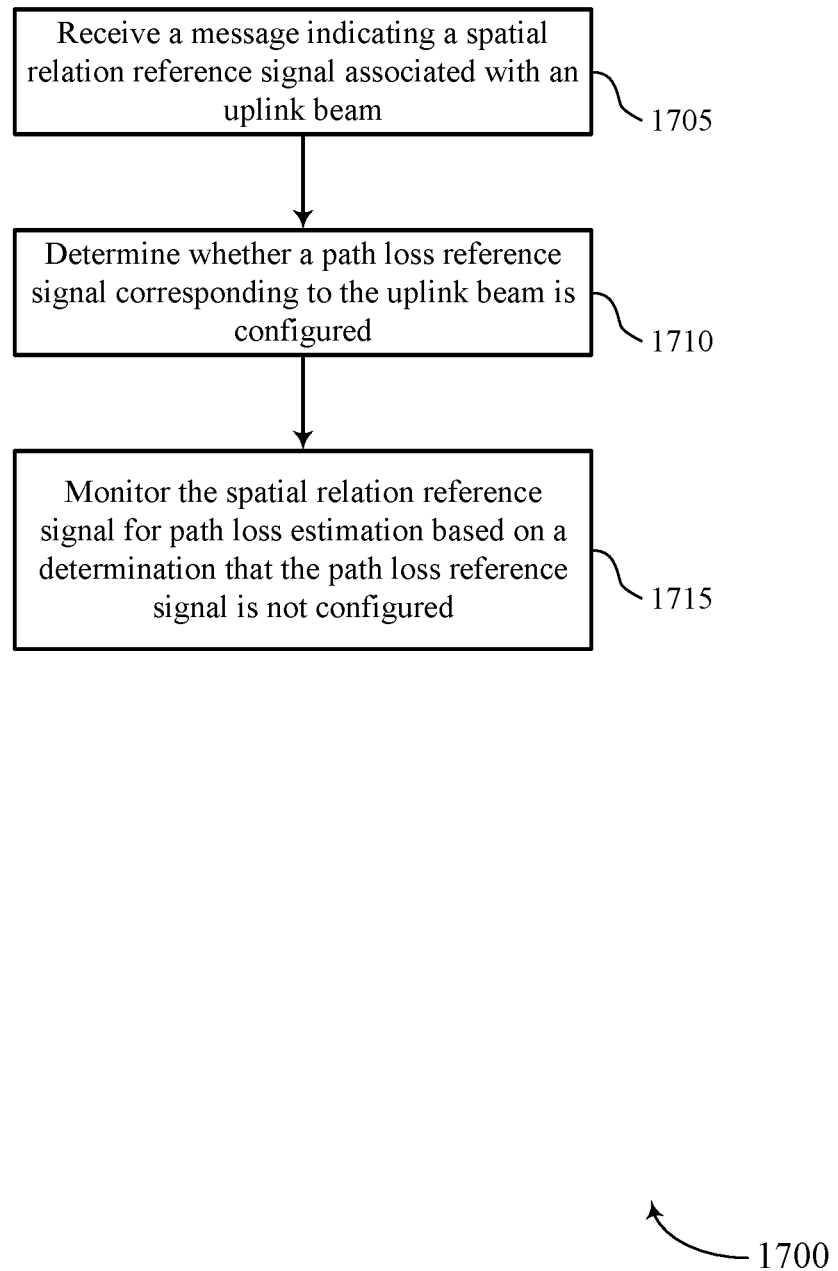

FIG. 17 shows a flowchart illustrating a method 1700 that supports techniques for updating reference signals in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a message indicating a spatial relation reference signal associated with an uplink beam. The operations of 1705 may be performed according to the methods described herein. In some examples, aspects of the operations of 1705 may be performed by a reference signal manager as described with reference to FIGS. 7 through 10.

At 1710, the UE may determine whether a path loss reference signal corresponding to the uplink beam is configured. The operations of 1710 may be performed according to the methods described herein. In some examples, aspects of the operations of 1710 may be performed by a UE configuration component as described with reference to FIGS. 7 through 10.

At 1715, the UE may monitor the spatial relation reference signal for path loss estimation based on a determination that the path loss reference signal is not configured. The operations of 1715 may be performed according to the methods described herein. In some examples, aspects of the operations of 1715 may be performed by a monitoring component as described with reference to FIGS. 7 through 10.

Figure 18:
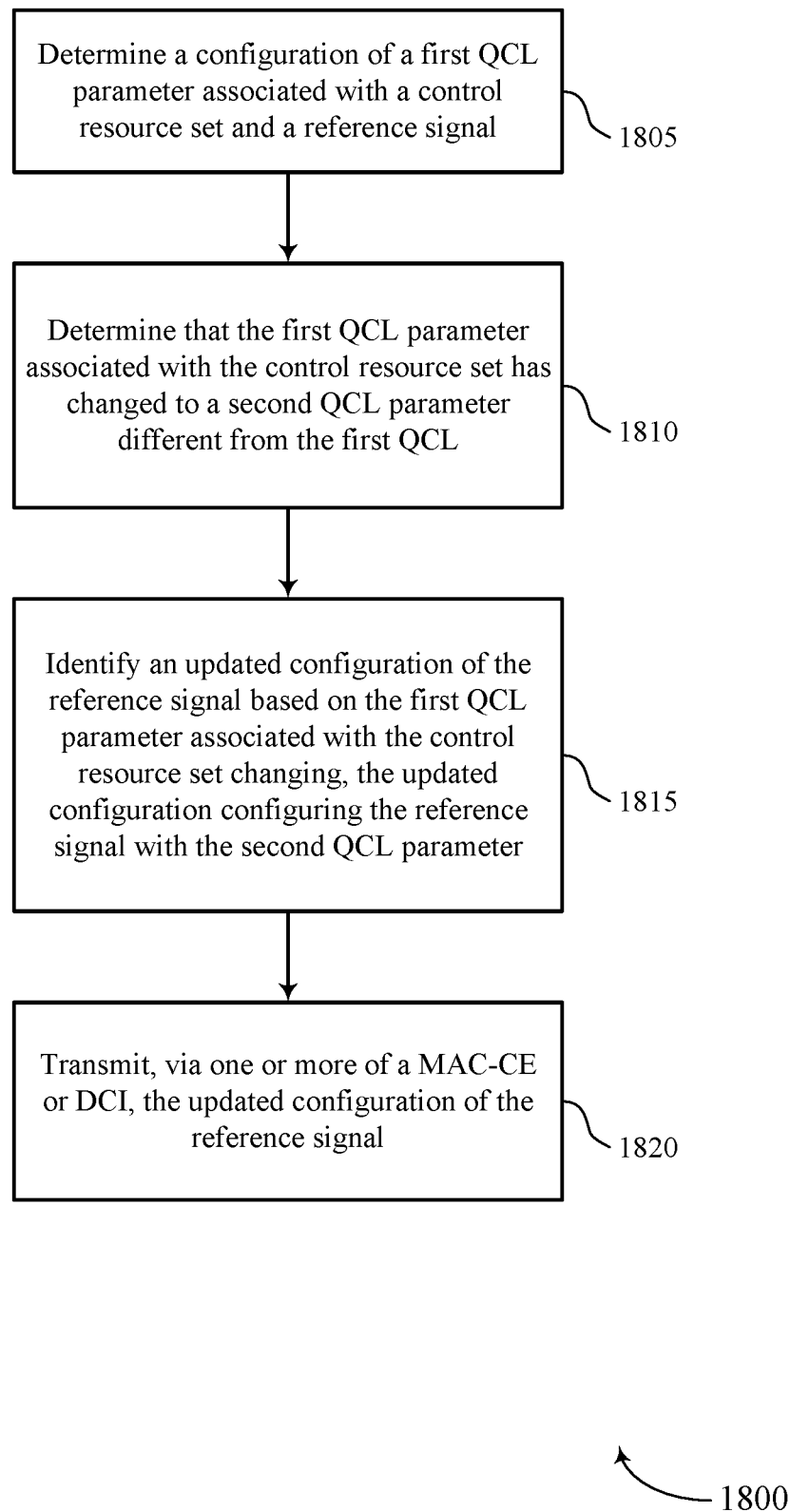

FIG. 18 shows a flowchart illustrating a method 1800 that supports techniques for updating reference signals in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may determine a configuration of a first QCL parameter associated with a control resource set and a reference signal. The operations of 1805 may be performed according to the methods described herein. In some examples, aspects of the operations of 1805 may be performed by a QCL configuration manager as described with reference to FIGS. 11 through 14.

At 1810, the base station may determine that the first QCL parameter associated with the control resource set has changed to a second QCL parameter different from the first QCL parameter. The operations of 1810 may be performed according to the methods described herein. In some examples, aspects of the operations of 1810 may be performed by a QCL configuration manager as described with reference to FIGS. 11 through 14.

At 1815, the base station may identify an updated configuration of the reference signal based on the first QCL parameter associated with the control resource set changing, the updated configuration configuring the reference signal with the second QCL parameter. The operations of 1815 may be performed according to the methods described herein. In some examples, aspects of the operations of 1815 may be performed by a reference signal configuration manager as described with reference to FIGS. 11 through 14.

At 1820, the base station may transmit, via one or more of a MAC-CE or DCI, the updated configuration of the reference signal. The operations of 1820 may be performed according to the methods described herein. In some examples, aspects of the operations of 1820 may be performed by a configuration signaling component as described with reference to FIGS. 11 through 14.

Figure 19:
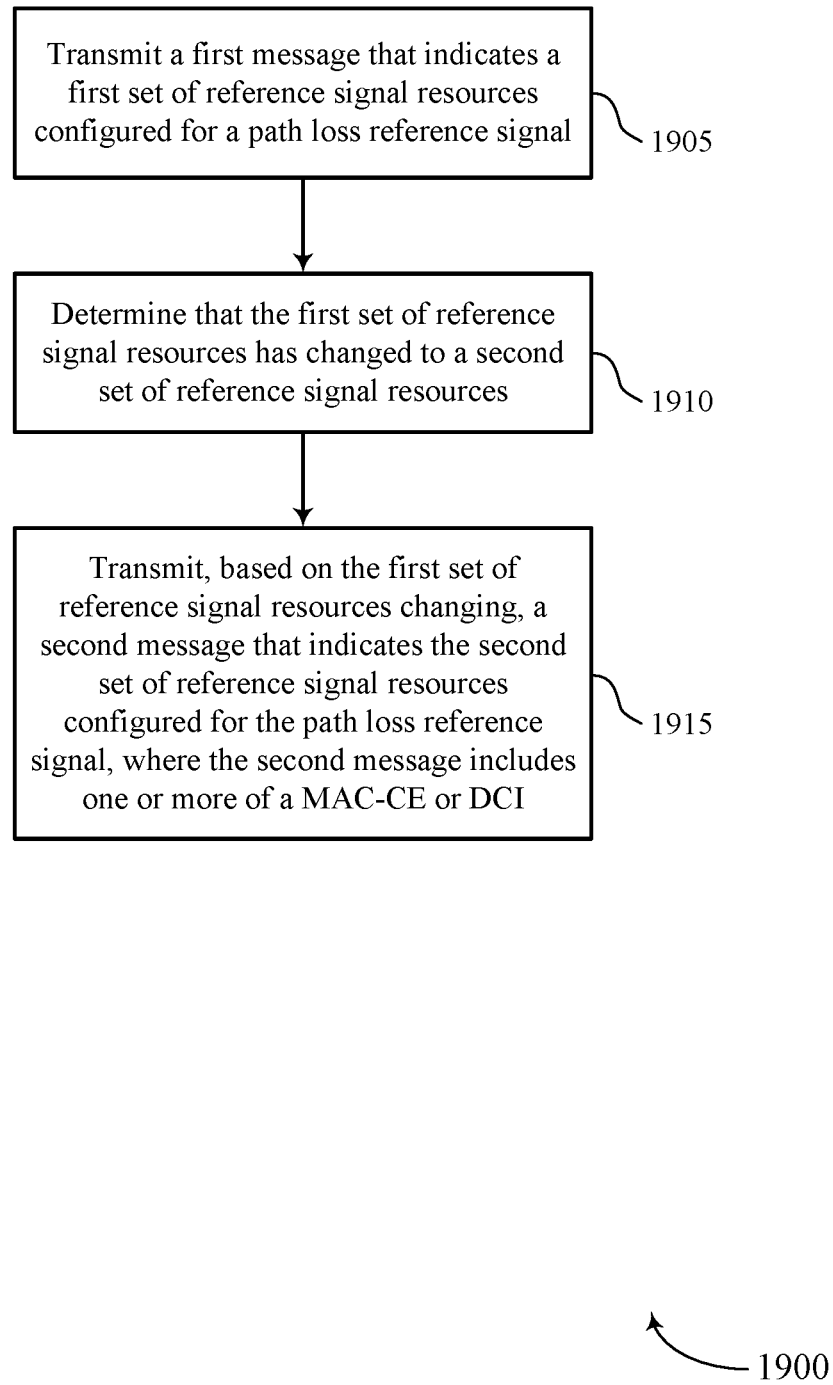

FIG. 19 shows a flowchart illustrating a method 1900 that supports techniques for updating reference signals in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit a first message that indicates a first set of reference signal resources configured for a path loss reference signal. The operations of 1905 may be performed according to the methods described herein. In some examples, aspects of the operations of 1905 may be performed by a reference signal resource manager as described with reference to FIGS. 11 through 14.

At 1910, the base station may determine that the first set of reference signal resources has changed to a second set of reference signal resources. The operations of 1910 may be performed according to the methods described herein. In some examples, aspects of the operations of 1910 may be performed by a reference signal resource manager as described with reference to FIGS. 11 through 14.

At 1915, the base station may transmit, based on the first set of reference signal resources changing, a second message that indicates the second set of reference signal resources configured for the path loss reference signal, where the second message includes one or more of a MAC-CE or DCI. The operations of 1915 may be performed according to the methods described herein. In some examples, aspects of the operations of 1915 may be performed by a configuration signaling component as described with reference to FIGS. 11 through 14.

Figure 20:
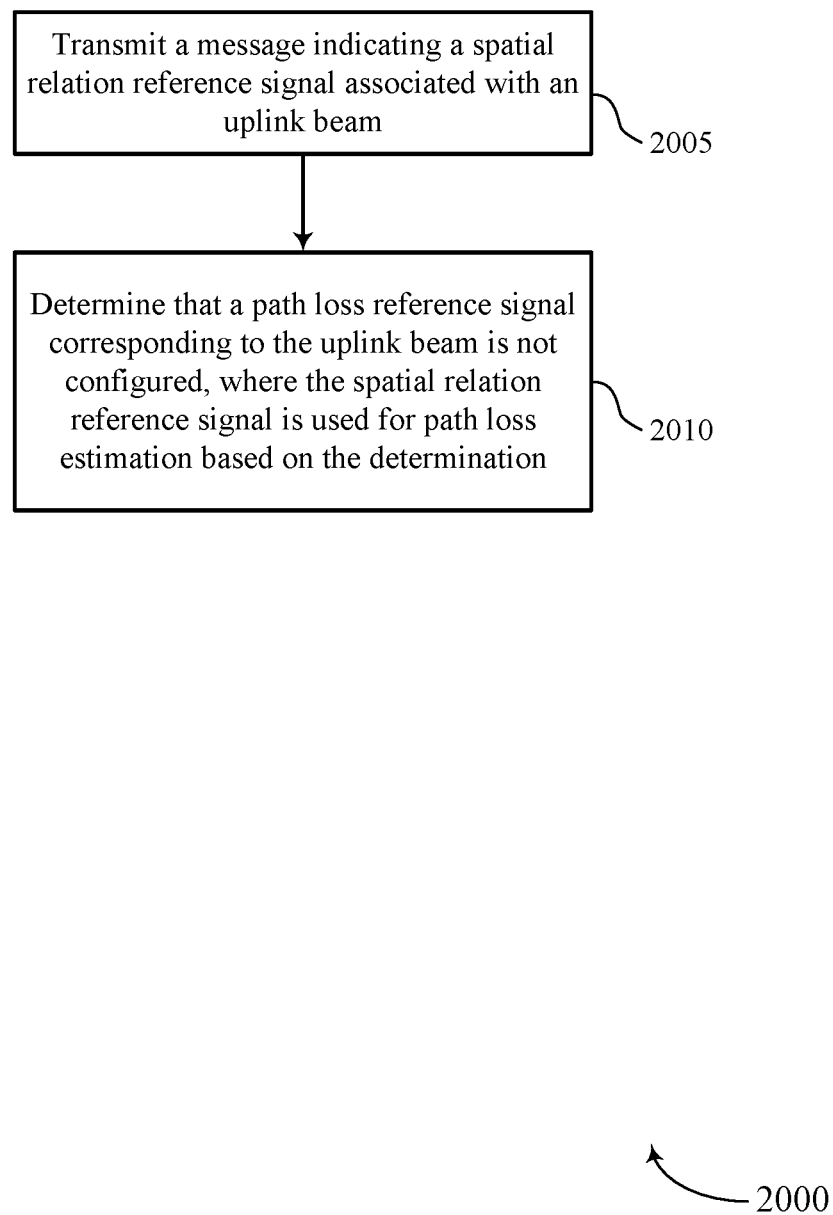

FIG. 20 shows a flowchart illustrating a method 2000 that supports techniques for updating reference signals in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit a message indicating a spatial relation reference signal associated with an uplink beam. The operations of 2005 may be performed according to the methods described herein. In some examples, aspects of the operations of 2005 may be performed by a configuration signaling component as described with reference to FIGS. 11 through 14.

At 2010, the base station may determine that a path loss reference signal corresponding to the uplink beam is not configured, where the spatial relation reference signal is used for path loss estimation based on the determination. The operations of 2010 may be performed according to the methods described herein. In some examples, aspects of the operations of 2010 may be performed by a reference signal configuration manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein. For instance, example 1 is a method for wireless communications that includes: identifying a configuration of a first QCL parameter associated with a CORESET and a reference signal and receiving, via one or more of a MAC-CE or DCI, an updated configuration for the reference signal based on the first QCL parameter associated with the CORESET changing, the updated configuration indicating that a second QCL parameter is configured for the reference signal.

In example 2, the method of example 1 may include determining that the reference signal includes a periodic CSI-RS for beam failure detection.

In example 3, the method of examples 1-2 may include determining that the reference signal includes one or more of a semi-persistent CSI-RS or an aperiodic CSI-RS for beam failure detection.

In example 4, the method of examples 1-3 may include the configuration indicating that the reference signal includes the semi-persistent CSI-RS or the aperiodic CSI-RS for beam failure detection.

In example 5, the method of examples 1-4 may include the reference signal comprising one or more of a BFD-RS, a periodic CSI-RS, or a time/frequency tracking reference signal (TRS).

In example 6, the method of examples 1-5 may include determining that the first QCL parameter associated with the CORESET may have changed to the second QCL parameter.

In example 7, the method of examples 1-6 may include identifying the updated configuration based on a format of the DCI.

In example 8, the method of examples 1-7 may include monitoring for the reference signal based on the second QCL parameter.

In example 9, the method of examples 1-8 may include receiving an RRC message including the configuration of the reference signal, where the first QCL parameter may be indicated by a transmission configuration indicator state identifier within the RRC message.

Example 10 is a method for wireless communications that includes: receiving a first message that indicates a first set of reference signal resources configured for a path loss reference signal and receiving, based on the first set of reference signal resources changing, a second message that indicates a second set of reference signal resources configured for the path loss reference signal, where the second message includes one or more of a MAC-CE or DCI.

In example 11, the method of example 10 may include overwriting the first set of reference signal resources with the second set of reference signal resources based on receiving the second message, and estimating a path loss for an uplink bandwidth part based on the second set of reference signal resources associated with the path loss reference signal.

In example 12, the method of examples 10-11 may include the first message including an RRC message for uplink power control.

In example 13, the method of examples 10-12 may include the uplink power control including one of more of physical uplink control channel power control, physical uplink shared channel power control, or SRS power control.

In example 14, the method of examples 10-13 may include the SRS power control including an aperiodic SRS.

In example 15, the method of examples 10-13 may include the SRS power control including an aperiodic SRS.

In example 16, the method of examples 10-15 may include the path loss reference signal including one or more of a CSI-RS or an SSB.

Example 17 is a method for wireless communications that includes: receiving a message indicating a spatial relation reference signal associated with an uplink beam, determining whether a path loss reference signal corresponding to the uplink beam is configured, and monitoring the spatial relation reference signal for path loss estimation based on a determination that the path loss reference signal is not configured.

In example 18, the method of example 17 may include determining that the spatial relation reference signal includes the path loss reference signal based on the determination that the path loss reference signal may be not configured, where the path loss estimation may be for uplink power control.

In example 19, the method of examples 17-18 may include the spatial relation reference signal corresponding to a set of physical uplink control channel resources.

In example 20, the method of examples 17-19 may include the spatial relation reference signal corresponding to a set of SRS resources indicated by an SRS resource indicator.

In example 21, the method of examples 17-20 may include the uplink power control comprising one of more of physical uplink control channel power control, physical uplink shared channel power control, or SRS power control.

In example 22, the method of examples 17-21 may include the spatial relation reference signal comprising one or more of an SSB, a CSI-RS, or an SRS.

Example 23 is a method for wireless communications that includes: determining a configuration of a first QCL parameter associated with a CORESET and a reference signal, determining that the first QCL parameter associated with the CORESET has changed to a second QCL parameter different from the first QCL parameter, identifying an updated configuration of the reference signal based on the first QCL parameter associated with the CORESET changing, the updated configuration configuring the reference signal with the second QCL parameter, and transmitting, via one or more of a MAC-CE or DCI, the updated configuration of the reference signal.

In example 24, the method of example 23 may include selecting a periodic CSI-RS as the reference signal, where the configuration indicates the periodic CSI-RS may be for beam failure detection.

In example 25, the method of examples 23-24 may include selecting one or more of a semi-persistent CSI-RS or an aperiodic CSI-RS as the reference signal, where the configuration indicates that one or more of the semi-persistent CSI-RS or the aperiodic CSI-RS may be for beam failure detection.

In example 26, the method of examples 23-25 may include a format of the DCI indicating the reference signal being configured with the second QCL parameter.

In example 27, the method of examples 23-26 may include the reference signal comprising one or more of a BFD-RS, a periodic CSI-RS, or a time/frequency tracking reference signal.

In example 28, the method of examples 23-27 may include transmitting the reference signal in accordance with the updated configuration.

In example 29, the method of examples 23-28 may include transmitting an RRC message including the configuration of the reference signal, where the first QCL parameter may be indicated by a transmission configuration indicator state identifier within the RRC message.

Example 30 is a method for wireless communications including: transmitting a first message that indicates a first set of reference signal resources configured for a path loss reference signal, determining that the first set of reference signal resources has changed to a second set of reference signal resources, and transmitting, based on the first set of reference signal resources changing, a second message that indicates the second set of reference signal resources configured for the path loss reference signal, where the second message includes one or more of a MAC-CE or DCI.

In example 31, the method of example 30 may include the second set of reference signal resources overwriting the first set of reference signal resources.

In example 32, the method of examples 30-31 may include the first message including an RRC message for uplink power control.

In example 33, the method of examples 30-32 may include the uplink power control comprising one of more of physical uplink control channel power control, physical uplink shared channel power control, or SRS power control.

In example 34, the method of examples 30-33 may include the SRS power control including an aperiodic SRS.

In example 35, the method of examples 30-33 may include the SRS power control including an aperiodic SRS.

Example 36 is a method for wireless communications including: transmitting a message indicating a spatial relation reference signal associated with an uplink beam and determining that a path loss reference signal corresponding to the uplink beam is not configured, where the spatial relation reference signal is used for path loss estimation based on the determination.

In example 37, the method of example 36 may include the spatial relation reference signal corresponding to a set of physical uplink control channel resources.

In example 38, the method of example 36-37 may include the spatial relation reference signal corresponding to a set of SRS resources indicated by an SRS resource indicator.

Example 39 is a system or apparatus including means for implementing a method or realizing an apparatus as in any of examples 1-38.

Example 40 is a non-transitory computer-readable medium storing instructions executable by one or more processors to cause the one or more processors to implement a method as in any of examples 1-38.

Example 41 is a system including one or more processors and memory in electronic communication with the one or more processors storing instructions executable by the one or more processors to cause the system or apparatus to implement a method as in any of examples 1-38.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications, comprising:
   receiving a first message for uplink power control that indicates a first set of configured downlink reference signal resources for a downlink reference signal, wherein the downlink reference signal comprises a path loss reference signal and the downlink reference signal is different from the received first message;
   receiving a second message in response to the first set of downlink reference signal resources having been overwritten by a second set of downlink reference signal resources configured for the path loss reference signal, the second message indicating the second set of downlink reference signal resources for the downlink reference signal for updating the uplink power control, wherein the second message is different from the first message and the second message comprises a medium access control (MAC) control element associated with updating reference signal configurations; and
   overwriting, in the uplink power control, the first set of downlink reference signal resources with the second set of downlink reference signal resources in response to receiving the second message.

2. The method of claim 1, wherein overwriting, in the uplink power control, the first set of downlink reference signal resources with the second set of downlink reference signal resources n response to receiving the second message, the method further comprising:
   estimating a path loss for an uplink bandwidth part based at least in part on the second set of downlink reference signal resources associated with the path loss reference signal.

3. The method of claim 1, wherein the first message comprises a radio resource control message for the uplink power control.

4. The method of claim 3, wherein the uplink power control comprises one or more of a physical uplink control channel power control, a physical uplink shared channel power control, or a sounding reference signal power control.

5. The method of claim 4, wherein the uplink power control comprises the sounding reference signal power control, wherein the sounding reference signal power control comprises an aperiodic sounding reference signal.

6. The method of claim 4, wherein the uplink power control comprises the sounding reference signal power control, wherein the sounding reference signal power control comprises a semi-persistent sounding reference signal.

7. The method of claim 1, wherein the path loss reference signal comprises one or more of a channel state information reference signal or a synchronization signal block.

8. A method for wireless communications, comprising:
   transmitting a first message for uplink power control that indicates a first set of configured downlink reference signal resources for a downlink reference signal, wherein the downlink reference signal comprises a path loss reference signal and the downlink reference signal is different from the transmitted first message;
   determining that a second set of downlink reference signal resources configured for the path loss reference signal has overwritten the first set of downlink reference signal resources; and
   transmitting a second message in response to the determination that the second set of downlink reference signal resources configured for the path loss reference signal has overwritten the first set of downlink reference signal resources, the second message indicating the second set of downlink reference signal resources for the downlink reference signal for updating the uplink power control with the second set of downlink reference signal resources configured for the path loss reference signal, wherein the second message is different from the first message and the second message comprises a medium access control (MAC) control element associated with updating reference signal configurations, and wherein the second set of downlink reference signal resources overwrites the first set of downlink reference signal resources in the uplink power control.

9. The method of claim 8, wherein the first message comprises a radio resource control message for the uplink power control.

10. The method of claim 9, wherein the uplink power control comprises one or more of a physical uplink control channel power control, a physical uplink shared channel power control, or a sounding reference signal power control.

11. The method of claim 10, wherein the uplink power control comprises the sounding reference signal power control, wherein the sounding reference signal power control comprises an aperiodic sounding reference signal.

12. The method of claim 10, wherein the uplink power control comprises the sounding reference signal power control, wherein the sounding reference signal power control comprises a semi-persistent sounding reference signal.

13. An apparatus for wireless communications, comprising:
a processor,
memory in electronic communication with the processor; and
instructions stored in the memory and executable by the processor to cause the apparatus to:
receive a first message for uplink power control that indicates a first set of configured downlink reference signal resources for a downlink reference signal, wherein the downlink reference signal comprises a path loss reference signal and the downlink reference signal is different from the received first message;
receive a second message in response to the first set of downlink reference signal resources having been overwritten by a second set of downlink reference signal resources configured for the path loss reference signal, the second message indicating the second set of downlink reference signal resources for the downlink reference signal for updating the uplink power control, wherein the second message is different from the first message and the second message comprises a medium access control (MAC) control element associated with updating reference signal configurations; and
overwrite, in the uplink power control, the first set of downlink reference signal resources with the second set of downlink reference signal resources in response to receiving the second message.

14. The apparatus of claim 13, wherein the instructions to overwrite the first set of downlink reference signal resources are executable by the processor to cause the apparatus to overwrite, in the uplink power control, the first set of downlink reference signal resources with the second set of downlink reference signal resources in response to receiving the second message, the instructions further executable by the processor to cause the apparatus to:
estimate a path loss for an uplink bandwidth part based at least in part on the second set of downlink reference signal resources associated with the path loss reference signal.

15. The apparatus of claim 13, wherein the first message comprises a radio resource control message for the uplink power control.

16. The apparatus of claim 15, wherein the uplink power control comprises one or more of a physical uplink control channel power control, a physical uplink shared channel power control, or a sounding reference signal power control.

17. The apparatus of claim 13, wherein the path loss reference signal comprises one or more of a channel state information reference signal or a synchronization signal block.

18. The apparatus of claim 16, wherein the uplink power control comprises the sounding reference signal power control, wherein the sounding reference signal power control comprises an aperiodic sounding reference signal.

19. The apparatus of claim 16, wherein the uplink power control comprises the sounding reference signal power control, wherein the sounding reference signal power control comprises a semi-persistent sounding reference signal.

20. An apparatus for wireless communications, comprising:
a processor,
memory in electronic communication with the processor; and
instructions stored in the memory and executable by the processor to cause the apparatus to:
transmit a first message for uplink power control that indicates a first set of configured downlink reference signal resources for a downlink reference signal, wherein the downlink reference signal comprises a path loss reference signal and the downlink reference signal is different from the transmitted first message;
determine that a second set of downlink reference signal resources configured for the path loss reference signal has overwritten the first set of downlink reference signal resources; and
transmit a second message in response to the determination that the second set of downlink reference signal resources configured for the path loss reference signal has overwritten the first set of downlink reference signal resources, the second message indicating the second set of downlink reference signal resources for the downlink reference signal to update the uplink power control with the second set of downlink reference signal resources configured for the path loss reference signal, wherein the second message is different from the first message and the second message comprises a medium access control (MAC) control element associated with updating reference signal configurations, and wherein the second set of downlink reference signal resources updates overwrites the first set of downlink reference signal resources in the uplink power control.

21. The apparatus of claim 20, wherein the first message comprises a radio resource control message for the uplink power control.

22. The apparatus of claim 21, wherein the uplink power control comprises one or more of a physical uplink control channel power control, a physical uplink shared channel power control, or a sounding reference signal power control.

23. The apparatus of claim 22, wherein the uplink power control comprises the sounding reference signal power control, wherein the sounding reference signal power control comprises an aperiodic sounding reference signal.

24. The apparatus of claim 22, wherein the uplink power control comprises the sounding reference signal power control, wherein the sounding reference signal power control comprises a semi-persistent sounding reference signal.

* * * * *